(12) United States Patent
Wu

(10) Patent No.: US 7,315,663 B2
(45) Date of Patent: Jan. 1, 2008

(54) ELECTRONICALLY CONTROLLED PHOTONIC CRYSTAL OPTICAL SWITCH

(75) Inventor: Wei Wu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/150,332

(22) Filed: Jun. 10, 2005

(65) Prior Publication Data

US 2006/0280396 A1 Dec. 14, 2006

(51) Int. Cl.
*G02F 1/295* (2006.01)
(52) U.S. Cl. .................. 385/9; 385/4; 385/16
(58) Field of Classification Search ............ 385/4, 385/14–24, 123–125, 147, 8, 9
See application file for complete search history.

(56) References Cited

U.S. PATENT DOCUMENTS

| 6,542,654 | B1* | 4/2003 | Miller et al. ............. 385/16 |
| 6,542,682 | B2* | 4/2003 | Cotteverte et al. ......... 385/125 |
| 6,778,722 | B1* | 8/2004 | Klocek et al. .............. 385/16 |
| 2005/0169590 | A1* | 8/2005 | Alkeskjold ............... 385/123 |

\* cited by examiner

*Primary Examiner*—Kevin S. Wood

(57) ABSTRACT

Various embodiments of the present invention are directed to photonic crystal switches. In one embodiment, a photonic crystal switch a photonic crystal switch includes a photonic-crystal-based light transmission layer that outputs an incident light beam in a selected, output direction. The photonic crystal switch may include two or more electrical contacts, positioned relative to the light transmission layer, to which a voltage is applied to select the output direction of the light beam.

16 Claims, 23 Drawing Sheets

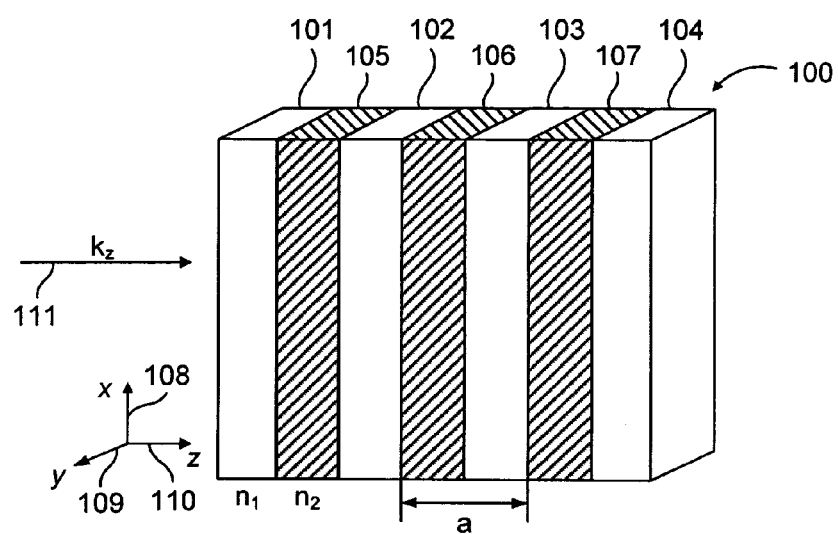
*Figure 1*
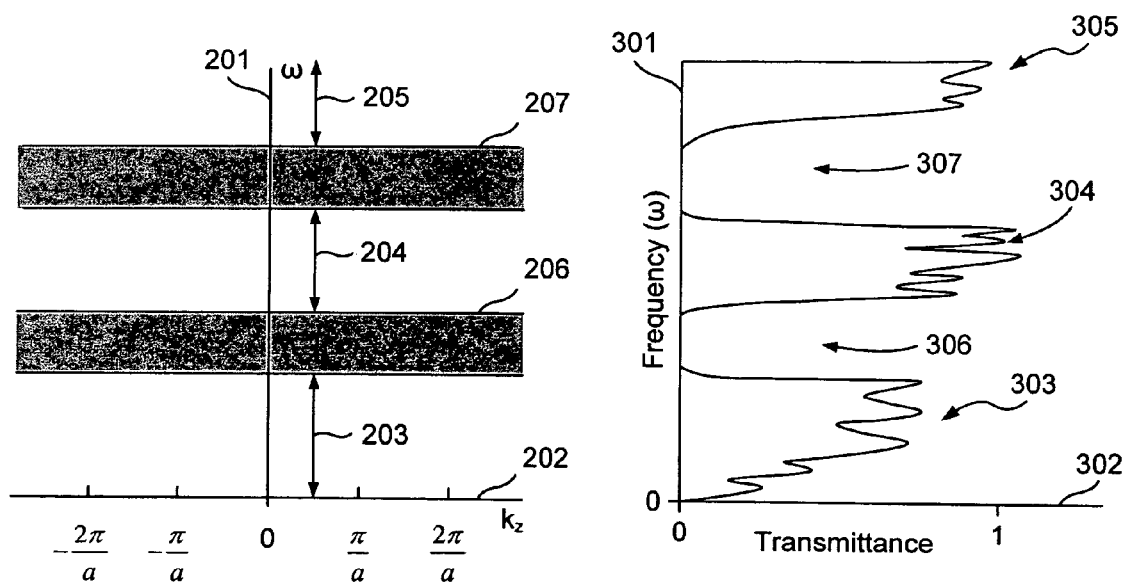
*Figure 2*          *Figure 3*

ELECTRONICALLY CONTROLLED PHOTONIC CRYSTAL OPTICAL SWITCH

TECHNICAL FIELD

The present invention relates to optical switching devices, and, in particular, to photonic-crystal-based optical switches that are controlled by externally applied electrical potentials.

BACKGROUND OF THE INVENTION

During the past fifty years, the electronics and computing industries have steadily and rapidly advanced the speed of digital computing devices. Semiconductor circuits and metal-conductor-based circuits have played a large role in electronic device technologies. However, semiconductors and metal-conductor-based circuits limit the rate at which electric current can be transmitted between computing devices. For example, manufacturers and designers typically employ copper or aluminum wires to transmit data in the form of electric current or voltage signals. However, the speed limit at which electric current flows through a copper or aluminum wire is about one-tenth of the speed of light. The speed at which copper and aluminum wires transmit electric current limits the rate at which data can be exchanged between computing devices.

Digitized beams of light, such as visible light and infrared ("IR") light, represent an alternative digital signal information transmitting medium. Unlike electric-current-based signals, light signals can be transmitted at speeds approaching the speed of light. As a result, light-based computing devices may conceivably be faster than electric-current-or-voltage-based computing devices. For example, light-based computing devices that use light signals to transmit digital information may perform operations at about 10 or more times faster than electric-current-based computing devices.

In general, light-based computing devices use optical fibers to transmit digitized light signals. Optical fibers are typically composed of a thin glass or silicon center, referred to as the "core," that transmits light signals, and a glass or silicon outer layer having a higher refractive index surrounding the core, referred to as the "cladding layer." The cladding layer reflects light that escapes the core back into the core. An optical fiber that transmits light having a single frequency may have a core diameter that ranges from about 7 microns to about 60 microns, and an optical fiber that transmits light having multiple different frequencies may have a core diameter that ranges from about 60 microns to about 70 microns.

It is often the case that a single optical fiber is used to transmit light signals that are destined for two or more different devices. For example, it may be necessary to transmit a first light signal through an optical fiber to a first device and transmit a second light signal through the same optical fiber to a second device. Typically, manufacturers and designers employ an electric-current-or-voltage-based optical switch to transmit light signals transmitted by a first optical fiber to one or more different optical fibers. In general, electric-current-based-optical switches are composed of an optical receiver and one or more transmitters. The optical receiver accepts an incoming light signal from a first optical fiber, encodes the light signal into an electric-current-or-voltage-based signal which is, in turn, transmitted to one or more of the transmitters. The optical receiver may use a photocell or photodiode to detect the light signal transmitted by the first optical fiber. A transmitter receiving the electric-current-or-voltage-based signal directs an optical device to transmit a light signal to a second optical fiber by turning a light source "on" and "off" in a sequence that regenerates the original light signal. Unfortunately, employing an electric-current-or-voltage-based optical switch to transmit a light signal from a first optical fiber to a second optical fiber delays the light-based-signal-transmission time. Manufacturers, designers, and users of optical based computing devices have recognized the need for faster optical switching devices.

SUMMARY OF THE INVENTION

Various embodiments of the present invention are directed to photonic crystal switches. In one embodiment, a photonic crystal switch a photonic crystal switch includes a photonic-crystal-based light transmission layer that outputs an incident light beam in a selected, output direction. The photonic crystal switch may include two or more electrical contacts, positioned relative to the light transmission layer, to which a voltage is applied to select the output direction of the light beam.

BRIEF DESCRIPTION OF THE DRAWINGS

FIG. 1 illustrates a one-dimensional example photonic crystal.

FIG. 2 is a hypothetical plot of angular frequencies versus wave number for the photonic crystal shown in FIG. 1.

FIG. 3 is a hypothetical plot of angular frequency versus transmittance for the photonic crystal shown in FIG. 1.

DETAILED DESCRIPTION OF THE INVENTION

Figure 4:
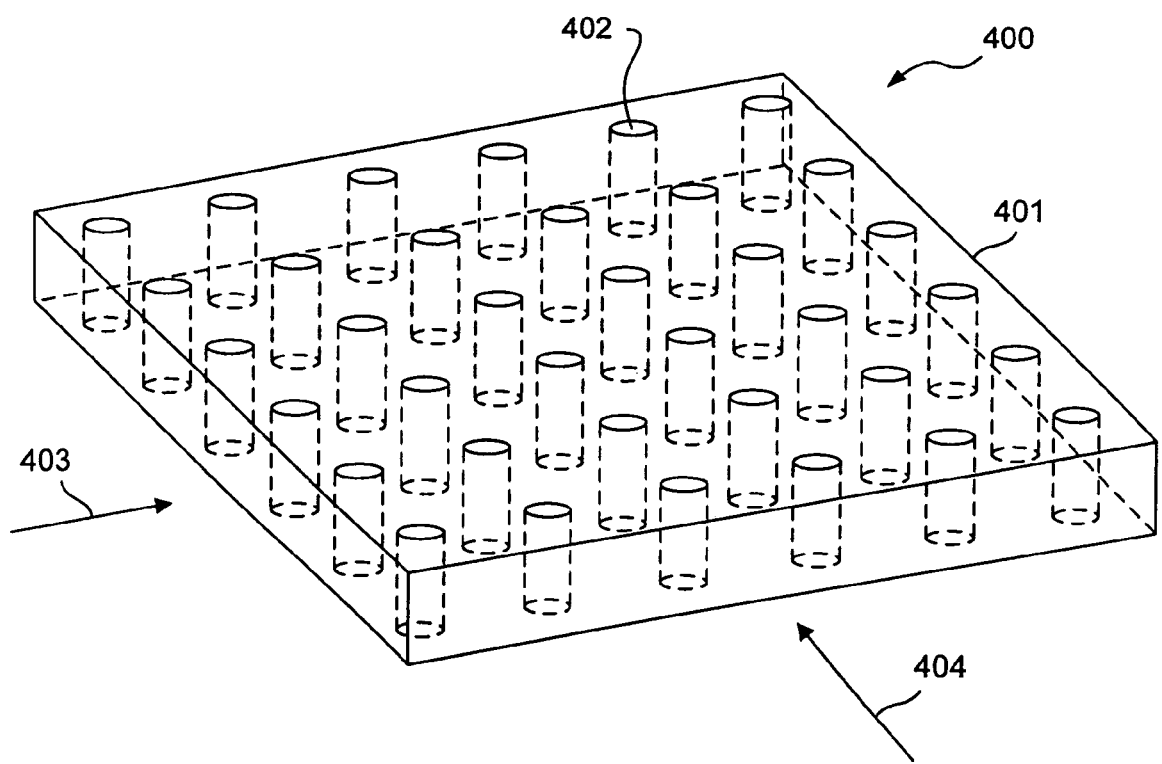
FIG. 4 illustrates a perspective view of an example two-dimensional photonic crystal.

Various embodiments of the present invention are directed to photonic crystal switches. In one embodiment, a photonic crystal switch includes a photonic crystal interlayer composed of a photonic crystal slab having two or more branching waveguides surrounded by regularly spaced liquid-crystal-filled columns. The two or more branching waveguides are able to confine and bend light within a certain angular frequency range through the photonic crystal slab. Each of the branching waveguides can be disabled by applying an electric field to change the refractive index of the liquid crystal that fills the columns lining the waveguides.

In the description of the present invention below, the term "light" refers to all wavelengths of radiation in the electromagnetic spectrum. For example, the term "light" may refer to visible light radiation having wavelengths of about 1 µm or to microwave radiation having wavelengths of about 1 cm. The present invention is described below in the subsections: (1) an overview of photonic crystals; (2) an overview of liquid crystals; and (3) embodiments of the present invention.

Overview of Photonic Crystals

Photonic crystals are patterned with materials having different refractive indices that can modify the propagation characteristics of light. FIG. 1 illustrates a one-dimensional example photonic crystal. The term "one-dimensional" refers to the periodicity of alternating materials in a direction normal to the layers of the material. For example, in FIG. 1, photonic crystal 100 is composed of two different alternating layers of material, each layer having a different refractive index. For example, layers 101-104 are composed of a first material having a refractive index denoted by $n_1$, while hash-marked layers 105-107 are composed of a second material having a refractive index denoted by $n_2$. Directional arrows 108-110 identify the three-dimensional x, y, and z coordinate axes, respectively, and directional arrow 111 represents the direction of a hypothetical incident beam of light beam that impinges on photonic crystal 100 parallel to the z-coordinate-axis. The spatial period of the alternating layers is called the "lattice constant" and is denoted by a. The lattice constant a is parallel to the direction of the light transmitted into photonic crystal 100.

In general, as light is transmitted into a photonic crystal, the refractive index pattern of the different materials comprising the photonic crystal creates one or more angular frequency ranges, referred to as "photonic bandgaps," for which no light is transmitted through the photonic crystal. Light having frequencies within the photonic bandgap cannot propagate through the photonic crystal regardless of polarization and angle of incidence. The photonic bandgap for a photonic crystal can be determined from Maxwell's equations. Light waves are composed of an electric field component and a mutually perpendicular magnetic field component with both fields directed transverse to the propagation direction vetor, $\vec{r}$, of the light wave. Two of Maxwell's equations describe the electric field and magnetic field components of a light wave propagating through a photonic crystal as follows:

Equation 1:

$$\nabla \times \vec{E}(\vec{r}, t) = -\mu_0 \frac{\partial \vec{H}(\vec{r}, t)}{\partial t}$$

Equation 2:

$$\nabla \times \vec{H}(\vec{r}, t) = \frac{\partial \varepsilon_0 \varepsilon(\vec{r}) \vec{E}(\vec{r}, t)}{\partial t}$$

where t is time, $\vec{H}(\vec{r},t)$ is the magnetic field, $\vec{E}(\vec{r},t)$ is the electric field, $\epsilon(\vec{r})$ is the relative dielectric constant and is a periodic function of the photonic crystal lattice constant, $\epsilon_0$ is the free space dielectric constant, and $\mu_0$ is the free space magnetic permeability.

Applying the curl operator to Equation 2 and substituting Equation 1 into Equation 2 removes the electric field function and turns Equation 2 into the following eigenvalue problem in three-dimensions:

Equation 3:

$$\nabla \times \left[ \frac{1}{\varepsilon(\vec{r})} \nabla \times \vec{H}(\vec{r},t) \right] = -\mu_0 \varepsilon_0 \frac{\partial^2}{\partial t^2} \vec{H}(\vec{r},t)$$

Equation 3 suggests that the magnetic field $\vec{H}(\vec{r},t)$ varies independently with respect to $\vec{r}$ and t. In other words, the spatial derivatives on the left hand side of Equation 3 and the time derivative on the right side of Equation 3 are equal to the same constant. As a result, the method of separation of variables can be applied to Equation 3 to provide a solution in the form given by:

$$\vec{H}(\vec{r},t) = \exp(-i\omega(\vec{k})t)\vec{H}(\vec{r}) \qquad \text{Equation 4}$$

where $\omega(\vec{k})$ is the angular frequency of the light wave, $\vec{H}(\vec{r})$ is a periodic function of the lattice constant, and $\vec{k}$ is the wavevector.

Because the dielectric constant $\epsilon(\vec{r})$ is periodic, according to the Bloch-Floquet theorem the solutions provided by Equation 4 can be rewritten as follows:

$$\vec{H}(\vec{r},t) = \exp(\vec{k}\cdot\vec{r} - i\omega(\vec{k})t)\vec{H}_{\vec{k}}(\vec{r})$$

where $\vec{H}_{\vec{k}}(\vec{r})$ is a periodic function of the lattice constant.

Substituting Equation 5 into Equation 3 provides the following eigenvalue problem:

Equation 6:

$$(\nabla + i\vec{k}) \times \left[ \frac{1}{\varepsilon(\vec{r})} (\nabla + i\vec{k}) \times \vec{H}_{\vec{k}}(\vec{r}) \right] = -\frac{\omega(\vec{k})^2}{c^2} \vec{H}_{\vec{k}}(\vec{r})$$

where $c = \frac{1}{\sqrt{\varepsilon_0 \mu_0}}$ is the speed of light in free space, and $\frac{\omega(\vec{k})^2}{c^2}$ are the *eigenvalues*.

Because the length of a photonic crystal is finite, boundary conditions are placed on Equation 6, which results in discrete eigenvalues, $\omega_n(\vec{k})$, and discrete eigenfunctions, $H_{n,\vec{k}}(\vec{r})$, where n is any positive integer. Plotting angular frequency $\omega_n(\vec{k})$ versus the magnitude of wavevector $\vec{k}$ reveals photonic bandgaps within the angular frequency band range for light waves transmitted through a photonic crystal.

Using Equation 6, the photonic bandgaps for photonic crystal 100, shown in FIG. 1, can be determined for light transmitted into photonic crystal 100 in the direction of directional arrow 111. For photonic crystal 100, the eigenvalue problem given by Equation 6 reduces to the following eigenvalue problem:

Equation 7:

$$\left(\frac{\partial}{\partial z} + ik_z\right) \left[\frac{1}{\varepsilon(z)}\left(\frac{\partial}{\partial z} + ik_z\right) H_{n,k_z}(z)\right] = -\frac{\omega_n(k_z)^2}{c^2} H_{n,k_z}(z)$$

where $\epsilon(z)=\epsilon(z+\alpha)$, n is any positive integer.

Mathematically, the eigenvalue problem given by Equation 7 has boundary conditions imposed by the finite length of photonic crystal 100, which results in discrete eigenvalues, $\omega_n(k_z)$, and discrete eigenfunctions, $H_{n,k_z}(z)$, associated with any positive integer n. The eigenvalues, $\omega_n(k_z)$, represent the angular frequencies of light waves impinging on photonic crystal 100 in the direction of arrow 111.

Plotting angular frequencies, $\omega_n(k_z)$, as a function of wavenumber, $k_z$, reveals the angular frequency band structure of photonic crystal 100. FIG. 2 is a hypothetical plot of angular frequencies versus wavenumber for the photonic crystal shown in FIG. 1. In FIG. 2, vertical line 201 represents a frequency axis, and horizontal line 202 represents a wavenumber axis. Angular frequency bands 203-205 identify light-wave-angular-frequency ranges that propagate through photonic crystal 100. Shaded regions 206 and 207 identify the photonic bandgaps. If photonic crystal 100 is excited with white light parallel to the direction of arrow 111, shown in FIG. 1, colors corresponding to angular frequencies in photonic bandgaps 206 and 207 are reflected, and the colors corresponding to angular frequencies in frequency bands 203-205 are transmitted through the photonic crystal. If the angle of a focused incident beam of light impinges on the photonic crystal in a direction different from directional arrow 111, the photonic bandgaps shift and different colors are reflected, because the light beam transmitted into the photonic crystal experiences a larger lattice constant, $\alpha'$ ($>\alpha$).

FIG. 3 is a hypothetical plot of angular frequencies versus transmittance for the photonic crystal shown in FIG. 1. In FIG. 3, vertical line 301 represents a frequency axis, while horizontal line 302 represents a transmittance axis. The transmittance can be determined by:

$$T = \frac{I_t}{I_i}$$

where $I_t$ is the intensity of light transmitted through a photonic crystal, and $I_i$ is the intensity of the incident light.

Curves 303-305, referred to as the "frequency-band spectrum," identify the angular frequency ranges in which light is transmitted through photonic crystal 100 parallel to the z-coordinate axis. Zero frequency-band spectrum ranges 306 and 307 identify the photonic bandgaps and correspond to photonic bandgaps 206 and 207, shown in FIG. 2.

Figure 5:
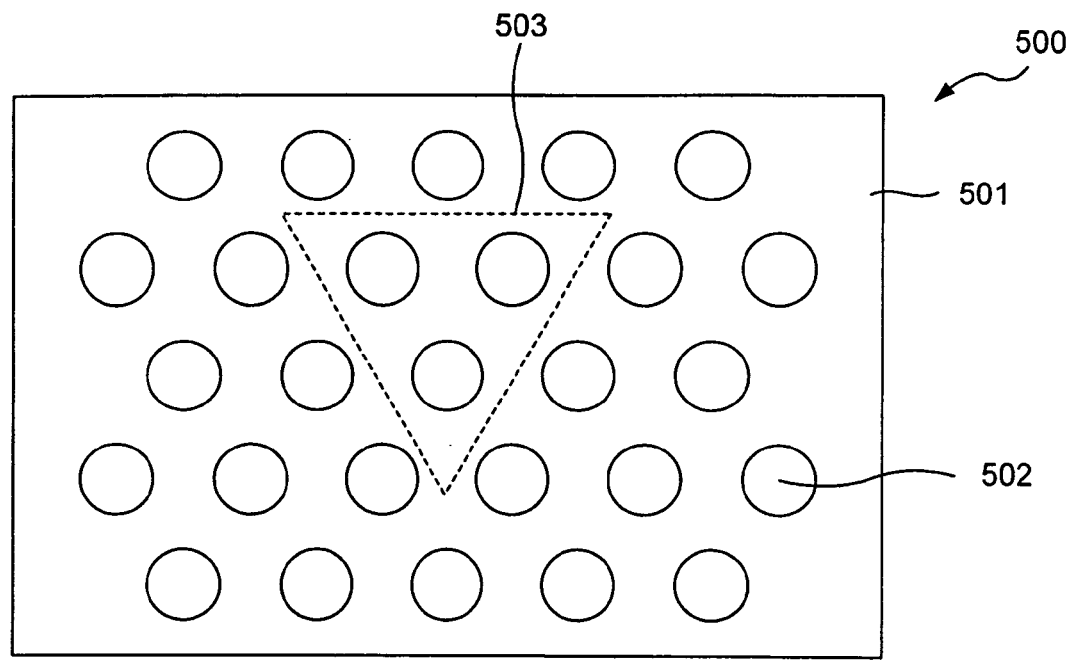
FIG. 5 illustrates a top-down view of a photonic crystal having a triangular lattice arrangement of cylindrical air columns.

Two-dimensional photonic crystals can be composed of a single slab of material having a regular array of cylindrical air columns arranged in a regular pattern to form a two-dimensional lattice. The term "two-dimensional" refers to the periodicity of the columns located within the photonic crystal. The contrast between the high refractive index of the photonic crystal slab and the lower refractive index of the cylindrical air columns creates photonic bandgaps. The higher refractive index of photonic crystal slab serves as the medium for transmitting light that does not fall within the photonic bandgaps. FIGS. 4-5 illustrate two of many different kinds of two-dimensional photonic crystals that employ a photonic crystal slab. FIG. 4 illustrates a perspective view of an example two-dimensional photonic crystal. In FIG. 4, photonic crystal 400 is composed of photonic crystal slab 401 having cylindrical air columns, such as cylindrical air column 402. The cylindrical air columns are arranged in a regular square lattice. Two orthogonal light beams impinging on the photonic crystal experience identical photonic bandgaps. For example, a focused beam of light impinging on photonic crystal 400 from the directions 403 and 404 experience identical photonic bandgaps.

The air-column arrangement in two-dimensional photonic crystals is not limited to a regular square lattice. For example, the cylindrical air columns can be arranged in a face-center-cubic lattice. FIG. 5 illustrates a top-down view of a photonic crystal having a triangular lattice arrangement of cylindrical air columns. In FIG. 5, photonic crystal 500 is composed of photonic crystal slab 501 having cylindrical air columns identified by circles, such as circle 502. Dashed-line enclosure 503 identifies a triangular unit cell of the lattice of cylindrical air columns.

Figure 6:
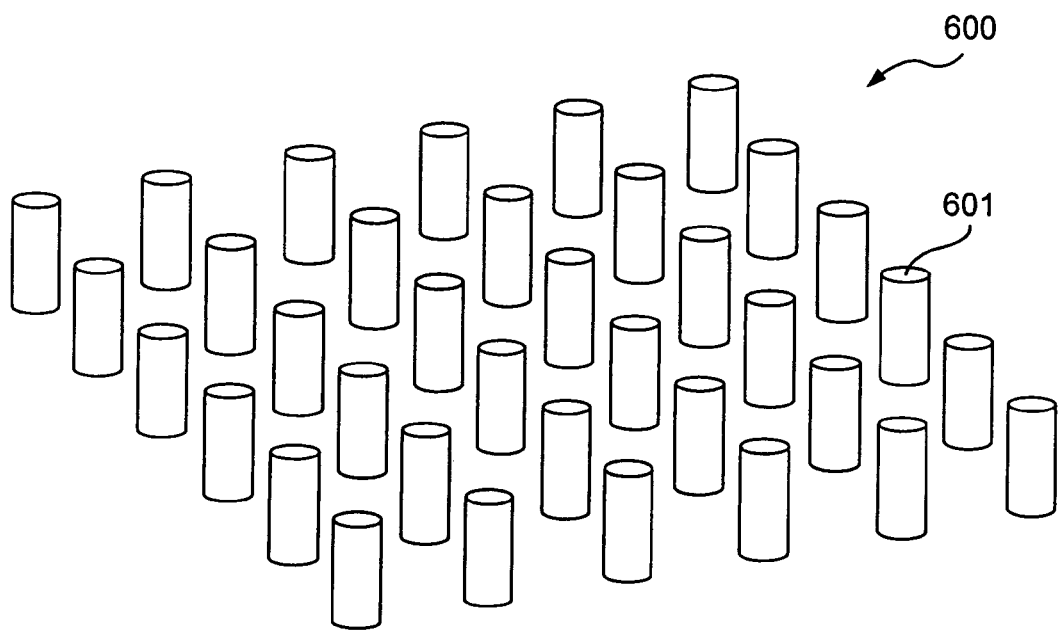
FIG. 6 illustrates a photonic crystal having a regular square lattice of cylindrical columns, each surrounded by vacant air space.

Two-dimensional photonic crystals can also be composed of a regular lattice arrangement of cylindrical columns surrounded by vacant air space. FIG. 6 illustrates a two-dimensional photonic crystal 600 having a regular square lattice of cylindrical columns, such as cylindrical column 601, each surrounded by vacant air space. In photonic crystal 600, the vacant air space between cylindrical columns serves as the transmitting medium for the light frequencies that do not fall within the photonic bandgap created by the contrast between the low refractive index of air and the higher refractive index of cylindrical columns.

Figure 7A:
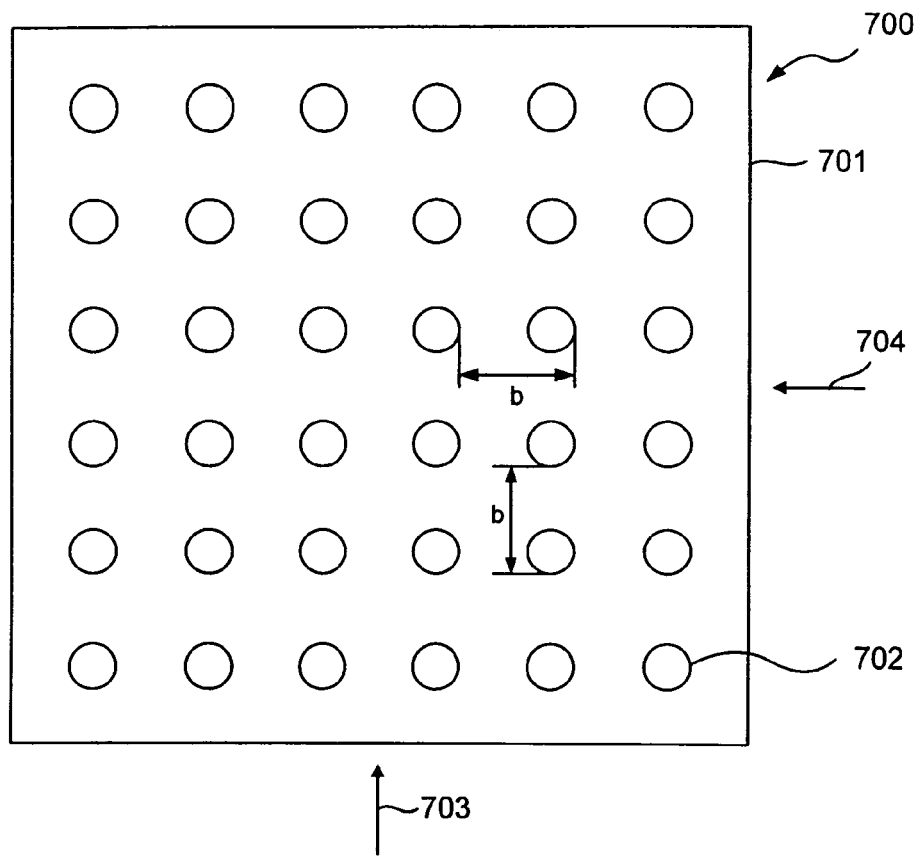
FIG. 7A illustrates a top-down view of a photonic crystal having a regular square lattice of air columns.
Figure 7B:
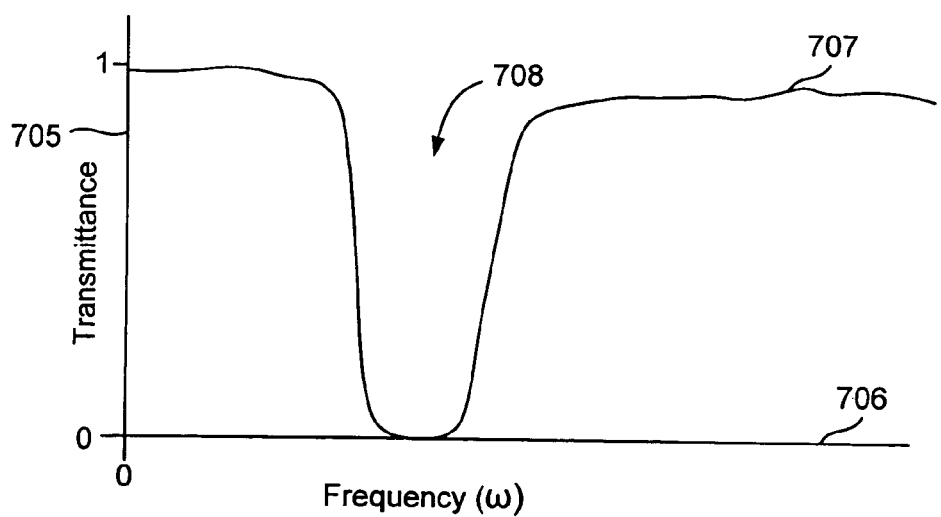
FIG. 7B is a hypothetical plot of transmittance versus angular frequency for the photonic crystal shown in FIG. 7A.

The photonic bandgaps in two-dimensional photonic crystals depend on the lattice constant, refractive indices of the materials composing the photonic crystal, and the incident light angle. FIG. 7A illustrates a top-down view of a photonic crystal having a regular square lattice of air columns. In FIG. 7A, photonic crystal 700 is composed of photonic crystal slab 701 having a regular square lattice of air columns, such as air column 702. The lattice constant is b for light transmitted into photonic crystal 700 in the directions indicated by arrows 703 and 704. FIG. 7B is a hypothetical plot of transmittance versus angular frequency for the photonic crystal shown in FIG. 7A. In FIG. 7B, and in subsequent hypothetical transmittance versus angular frequency plots, vertical lines, such as vertical line 705, represent transmittance axes, while horizontal lines, such as horizontal line 706, represent angular frequency axes. Frequency-band spectrum 707 represents the transmittance of light through photonic crystal 700 in either the direction represented by arrow 703 or arrow 704. Photonic bandgap 708 identifies an angular frequency range that is not transmitted through photonic crystal 700. Because the lattice constant is different for each incidence light angle, a focused beam of light impinging on photonic crystal 700 from directions other than directions identified by arrows 703 and 704 may change the width of photonic bandgap 708, may shift photonic bandgap 708 to a different angular frequency range, or may remove the occurrence of photonic bandgap 708 altogether.

A particularly useful property of two-dimensional photonic crystals is that paths, called "waveguides," can be created to confine and bend the transmission of light having angular frequencies within a photonic bandgap of two-dimensional photonic crystal. Waveguides can be created in photonic crystal slabs by selectively omitting row of air columns or by altering the size of certain air columns. Waveguides can be created in two-dimensional photonic crystal, such as the photonic crystal shown in FIG. 6, by omitting row of cylindrical columns or by changing the diameter of certain cylindrical columns. Waveguides transmit light that falls within a particular frequency range of a photonic bandgap with nearly 100% transmittance.

Figure 8:
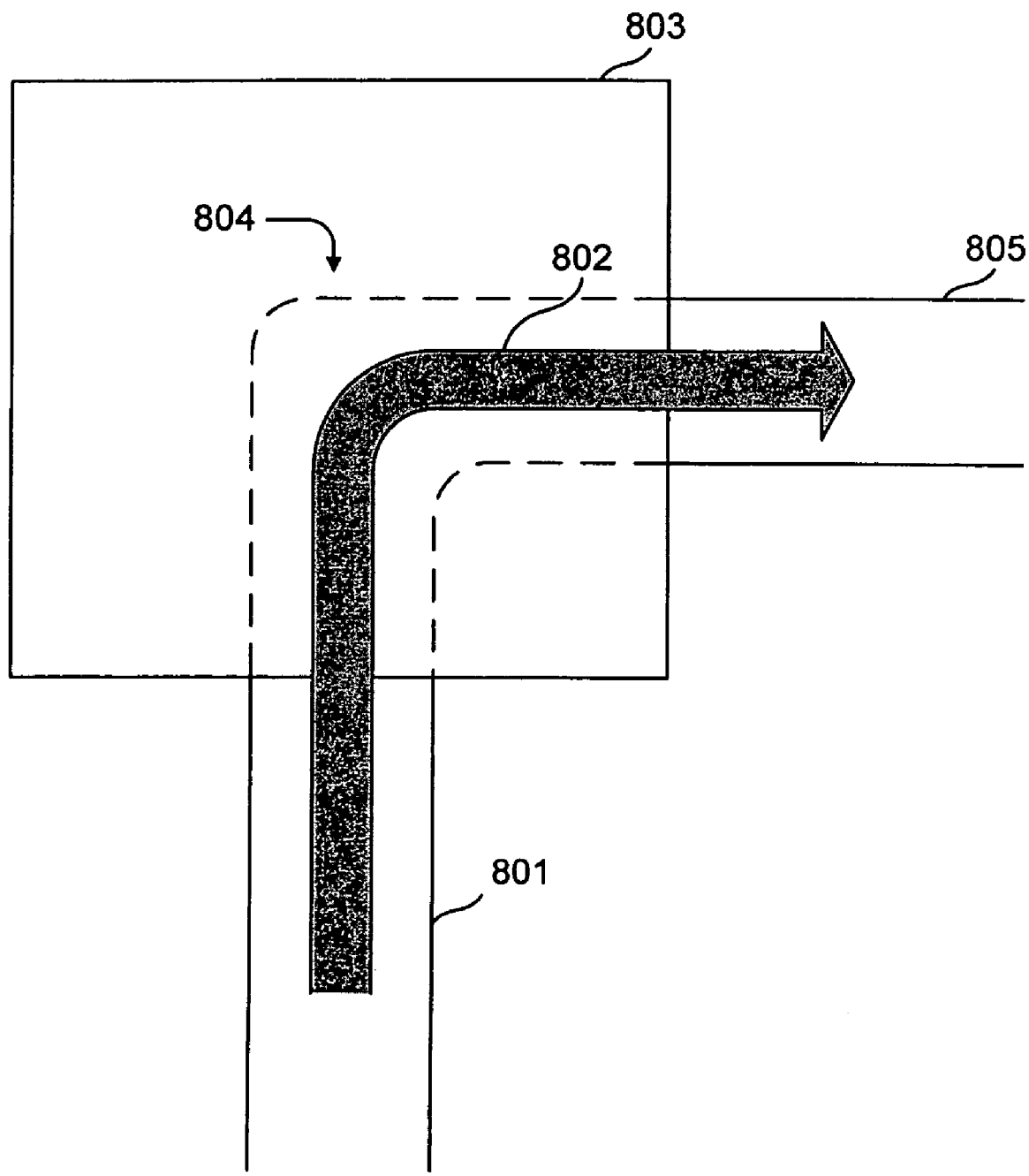
FIG. 8 illustrates conceptual use of a photonic crystal to transmit light from a first optical fiber to a second orthogonal optical fiber.

Optical fibers typically cannot be used to transmit light around corners because much of the light transmitted by the core is lost to the cladding layer due to refraction at sharp optical-fiber bends. However, a photonic crystal waveguide can be fabricated to transmit light around corners with nearly 100% transmittance for light having frequencies within the photonic bandgap of the photonic crystal. FIG. 8 illustrates conceptual use of a photonic crystal to transmit light from a first optical fiber to a second orthogonal optical fiber. In FIG. 8, optical fiber 801 transmits light waves along the path identified by directional arrow 802 into photonic crystal 803, through 90 degree bend 804, then into optical fiber 805.

Figure 9A:
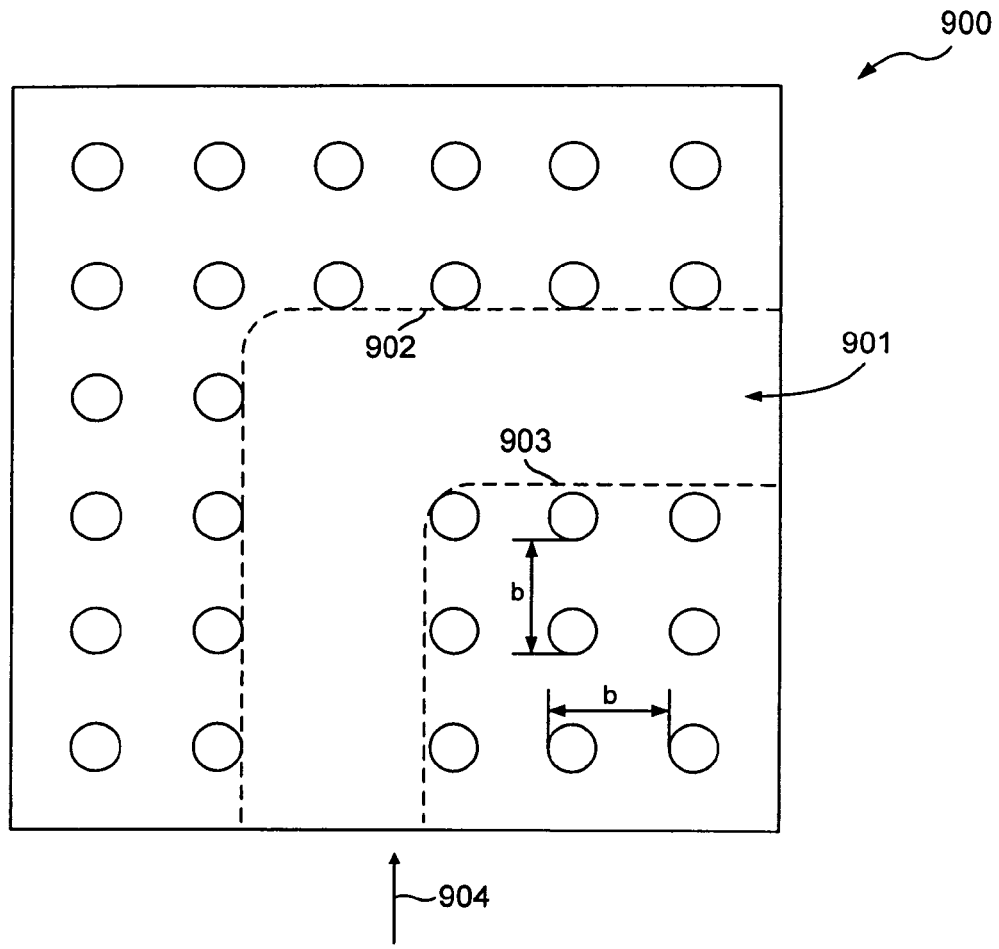
FIG. 9A illustrates a top-down view of photonic crystal slab having a waveguide surrounded by a regular square lattice of air columns.
Figure 9B:
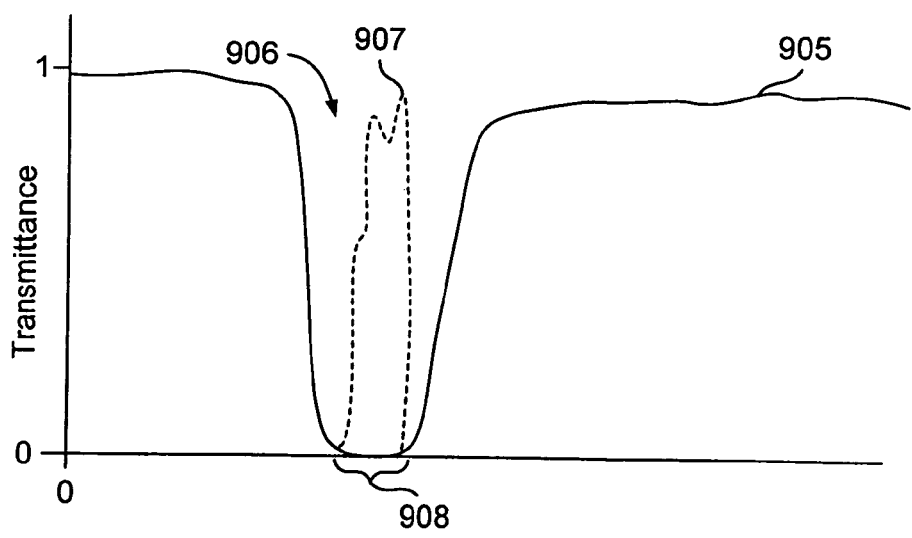
FIG. 9B is a hypothetical plot of transmittance versus angular frequency for the photonic crystal shown in FIG. 9A.

FIG. 9A illustrates a top-down view of photonic crystal slab having a waveguide surrounded by a regular square lattice of air columns. Photonic crystal 900 has a regular square lattice of air columns and lattice constant, b, identical to that of photonic crystal 700, shown in FIG. 7A. Waveguide 901 is fabricated by omitting air columns in the photonic crystal slab between dashed-line boundaries 902 and 903. FIG. 9B is a hypothetical plot of transmittance versus angular frequency for the photonic crystal shown in FIG. 9A. Solid curve 905 identifies the frequency-band spectrum and photonic bandgap 906 associated with light transmitted into photonic crystal 900 in the direction of arrow 904, shown in FIG. 9A. Dashed-line peak 907 identifies an angular frequency range 908 that is exclusively confined to, and directed by, waveguide 901.

Overview of Liquid Crystals

Liquid crystals have physical properties similar to both solids and liquids. For example, liquid crystals flow like a liquid but possess the optical properties of certain solids. Liquid crystal molecules are typically rod shaped organic moieties that range in length from about 20 to about 40 angstroms or longer. As discussed below, the refractive index of a liquid crystal depends on the orientation of the liquid crystal molecules with respect the incident angle of light. The orientation and position of liquid crystal molecules within a liquid crystal is typically determined by the liquid crystal shape and hydrogen-bonding effects. As a result, liquid crystals can be characterized by one of two possible phases, referred to as "nematic phase" and "smectic phase."

Figure 10:
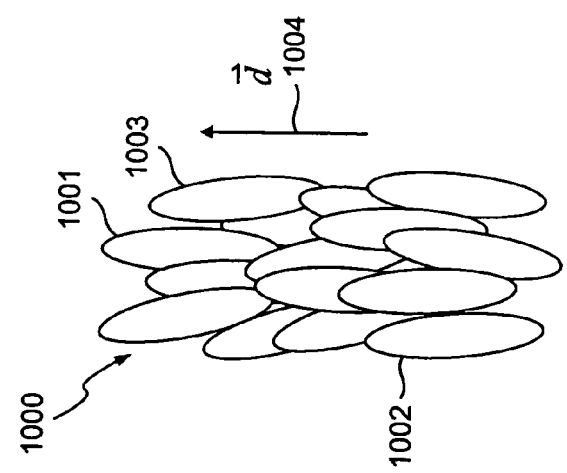
FIG. 10 illustrates an example of a nematic phase liquid crystal.

FIG. 10 illustrates an example of a nematic phase liquid crystal. In FIG. 10, the liquid crystal molecules of nematic phase liquid crystal 1000 are represented by elongated ellipses, such as elongated ellipse 1001. Nematic phase liquid crystal molecules do not have hydrogen-bonding functional groups, and the electric charge of each liquid crystal molecule is evenly distributed. As a result, liquid crystals in the nematic phase exhibit long-range orientational ordering but are randomly distributed. For example, liquid crystal molecules 1001-1003 exhibit orientational ordering because liquid crystal molecules 1001-1003 point in the same general direction, but liquid crystal molecules 1001-1003 are randomly positioned in liquid crystal 1000. In the nematic phase, averaging liquid crystal orientations provides a definite preferred direction, referred to as the "director," identified by vector 1004.

Figure 11B:
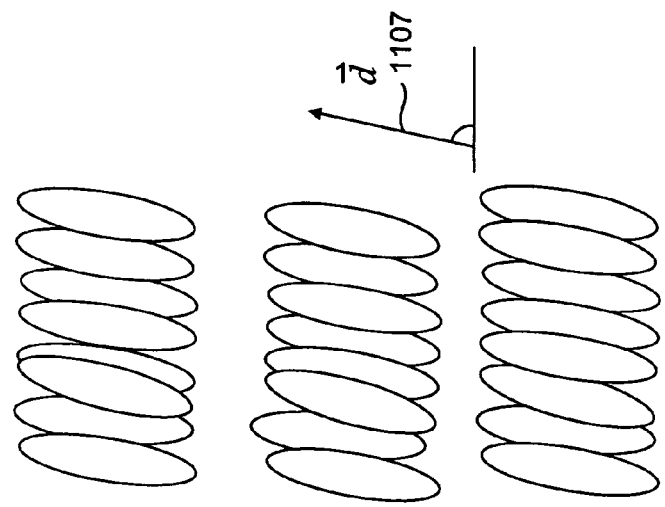
FIGS. 11A-11B illustrate smectic phase liquid crystals.
Figure 11A:
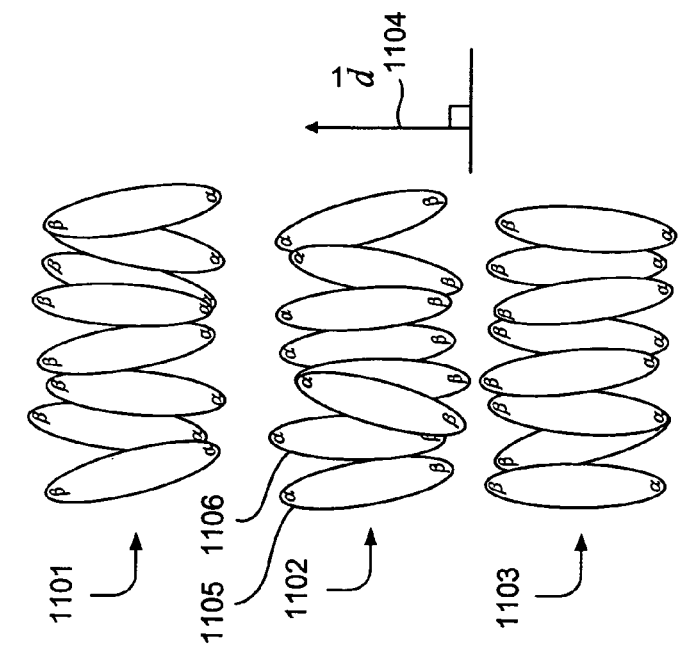

Smectic phase liquid crystals are turbid and viscous substances that exhibit both orientational order and positional order. FIGS. 11A-11B illustrate smectic phase liquid crystals. Liquid crystal molecules in the smectic phase are arranged into equidistant two-dimensional layers. For example, in FIG. 11A, liquid crystal rows 1101-1103 represent two-dimensional liquid crystal layers. The lateral spacing between the liquid crystal molecules within a layer may be regular or random. Hydrogen bonding between the polar groups links the liquid crystal molecules laterally. In FIG. 11A, the polar groups located at the end of the liquid crystal molecules that give rise to hydrogen bonding are labeled α and β. For example, in layer 1102, liquid crystal molecules 1105 and 1106 are linked together by hydrogen bonding between the α-labeled polar groups and hydrogen bonding between the β-labeled polar groups. Hydrogen bonding also causes the liquid crystal to cooperatively form head-to-head tail-to-tail bilayers. For example, the α-labeled polar groups in layer 1101 face the α-labeled polar groups in layer 1102, and the β labeled polar groups in layer 1102 face the β-labeled polar groups in layer 1103.

Smectic phase liquid crystals can be divided into two sub classes depending on the direction of the director. If the average orientation of the liquid crystal-molecule-long axis is perpendicular to the layers, the liquid crystal molecules are said to be in a "smectic A phase," and if the average orientation of the liquid crystal molecules is tilted with respect to the layers, the liquid crystals molecules are said to be in a "smectic B phase." FIG. 11A illustrates a smectic A phase liquid crystal. In FIG. 11A, liquid crystal molecules in layers 1101-1103 have a long axis average orientation perpendicular to the layers, as indicated by director 1104. FIG. 11B illustrates a smectic B phase liquid crystal. In FIG. 11B, the average orientation of the liquid crystal molecules within each layer is tilted with respect to the plane of each layer, as indicated by director 1107.

Figure 12A:
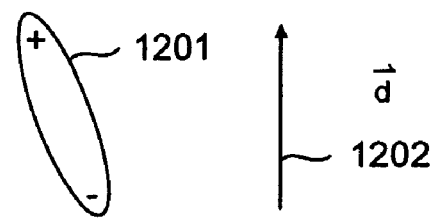
FIGS. 12A-12C illustrate a hypothetical application of an electric field to a liquid crystal molecule having a permanent dipole moment.
Figure 12B:
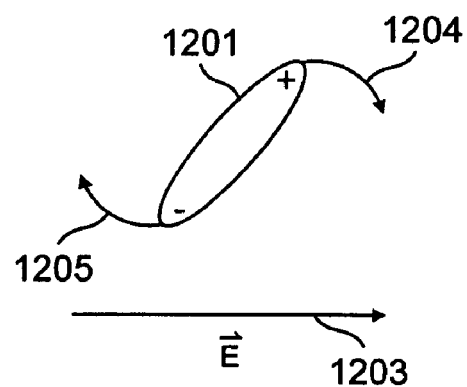
Figure 12C:
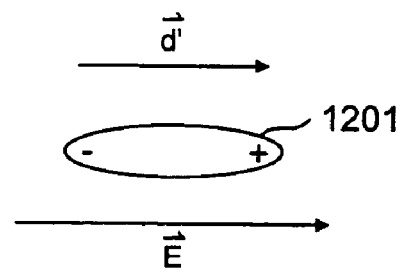

Typically, the orientation of liquid crystal molecules can be changed by application of an electric field. Applying an external electric field to liquid crystal molecules having a permanent electric dipole moment causes the liquid crystal-molecule-long axes to point in the direction of the electric field. Permanent dipole moments typically result from an uneven distribution of electric charge. FIGS. 12A-12C illustrate a hypothetical application of an electric field to a liquid crystal molecule having a permanent dipole moment. FIG. 12A illustrates liquid crystal molecule 1201 in the absence of an electric field. The long axis of liquid crystal molecule 1201 is oriented approximately parallel to director 1202. The permanent electric dipole moment of liquid crystal molecule 1201 is identified by the symbols "+" and "−." The symbol "−" identifies the end of liquid crystal molecule 1201 having a higher electric charge concentration than the end represented by the symbol "+." FIG. 12B illustrates liquid crystal molecule 1201 after an initial application of an electric field. Directional arrow 1203 identifies the direction of the applied electric field. Liquid crystal molecule 1201 experiences torques represented by directional arcs 1204 and 1205 causing the long axis of liquid crystal molecule 1201 to orient in the direction of the electric field. FIG. 12C illustrates that for as long as the electric field is present, the long axis of liquid crystal molecule 1201 points in the direction of the electric field.

Non-polar liquid crystal molecules may acquire a dipole moment in an electric field because the electric field distorts the liquid crystal molecule electron distributions and distorts the nuclear positions. Nuclei are distorted in the direction of the electric field, and the electrons are distorted in a direction opposite from that of the electric field. As a result, the long axes of non-polar liquid crystal molecules are reoriented in the direction of an applied electric field in a manner identical to reorienting liquid crystal molecules having permanent electric dipoles, as described above with reference to FIGS. 12A-12C.

Figure 13A:
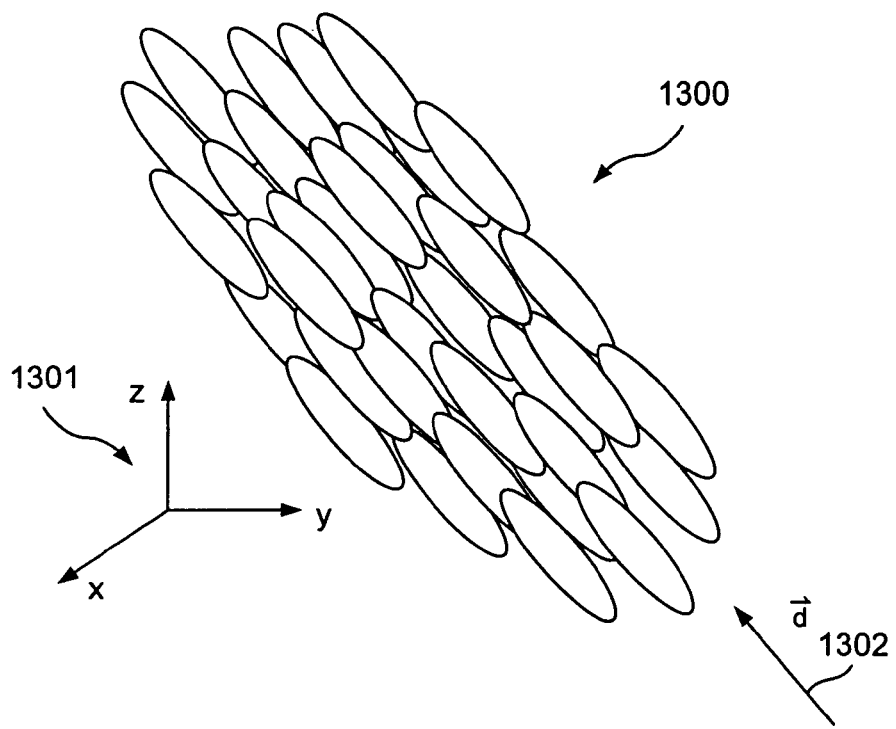
FIGS. 13A-14B illustrate conceptually changing a liquid crystal-refractive index by applying an electric field.
Figure 13B:
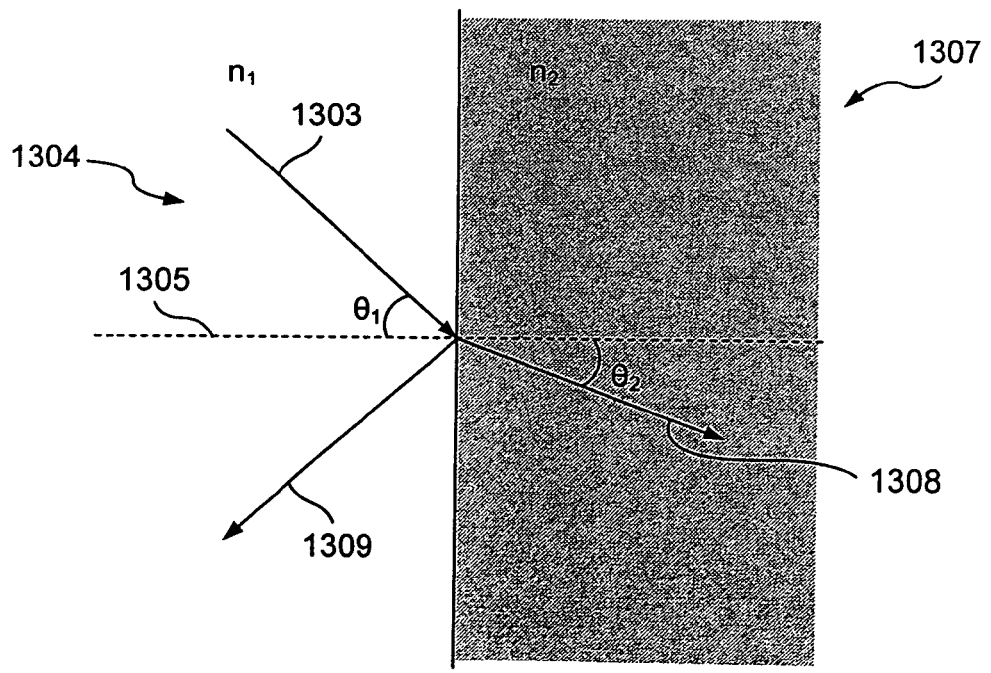
Figure 14A:
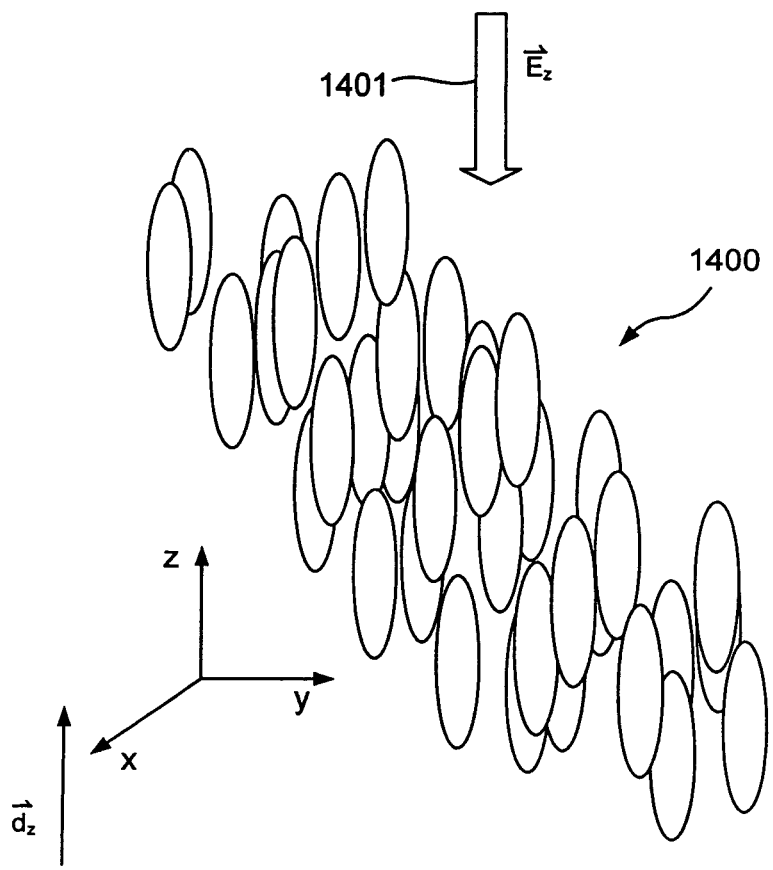
Figure 14B:
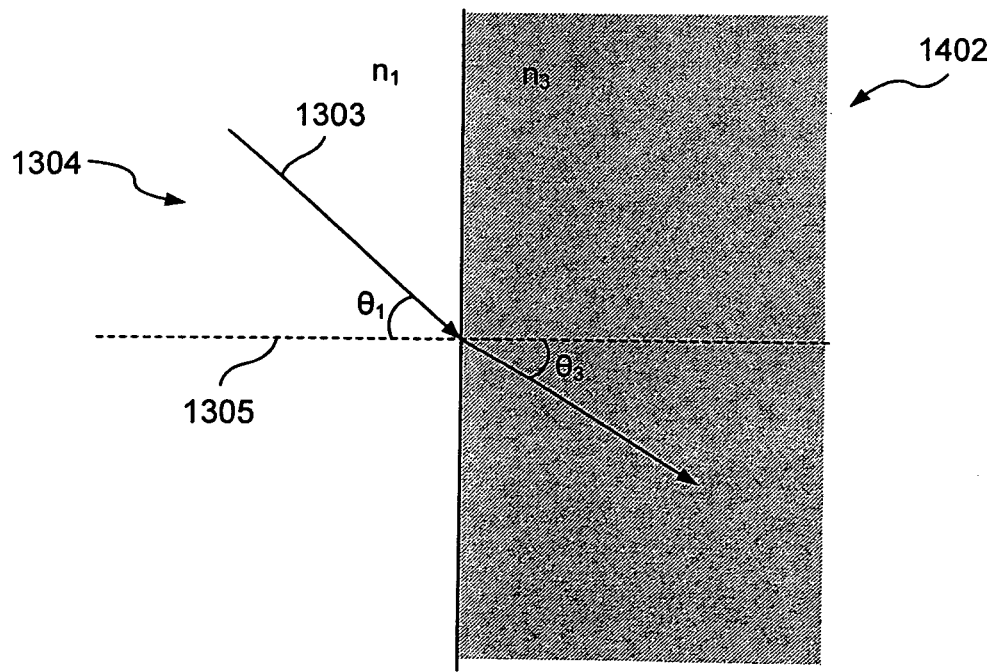

A liquid crystal refractive index depends on the orientation of the liquid crystal molecules with respect to the path of an incident light beam. For example, an incident light beam impinging on a liquid crystal parallel to the liquid crystal director experiences a different angle of refraction than an incident light beam impinging on the same liquid crystal perpendicular to the liquid crystal director. Also, for a fixed light beam angle of incidence, an electric field can be applied to a liquid crystal to change the refractive index of the liquid crystal. FIGS. 13A-14B illustrate conceptually changing a liquid crystal-refractive index by applying an electric field. FIG. 13A illustrates a hypothetical nematic phase liquid crystal 1300. In FIG. 13A, Cartesian coordinate system 1301 provides an orientational reference frame for liquid crystal 1300 and director 1302. FIG. 13B illustrates how liquid crystal 1300 refracts the path of incident light beam 1303. Unshaded region 1303 has a refractive index $n_1$ and transmits incident light beam 1303 with an angle of incidence $\theta_1$ to normal 1305. Shaded region 1307 contains liquid crystal 1300 having refractive index $n_2$ that is greater than refractive index $n_1$. Part of light beam 1303 is transmitted into region 1307 resulting in refracted light beam 1308, and part of light beam 1303 is reflected resulting reflected light beam 1309. Because index of refraction $n_2$ is larger than index of refraction $n_1$, according to Snell's law of refraction given by:

$$n_1 \sin \theta_1 = n_2 \sin \theta_2$$

the angle of refraction $\theta_2$ is smaller than the angle of incidence $\theta_1$. FIG. 14A illustrates a nematic phase liquid crystal in the presence of an electric field. Liquid crystal 1400 represents liquid crystal 1300, described above with reference to FIG. 13A, after application of electric field 1401 in a direction parallel to the z-coordinate axis. The liquid crystal-molecule-long axes are reoriented in the direction of electric field 1401, as described above with reference to FIG. 12A-12C. FIG. 14B illustrates refraction of incident light beam 1303 transmitted into reoriented liquid crystal 1400. Shaded region 1402 contains reoriented liquid crystal 1400 having refractive index $n_3$ different from refractive index $n_2$. As a result, the angle of refraction $\theta_3$ is different from angle of refraction $\theta_2$.

EMBODIMENTS OF THE PRESENT INVENTION

Figure 15A:
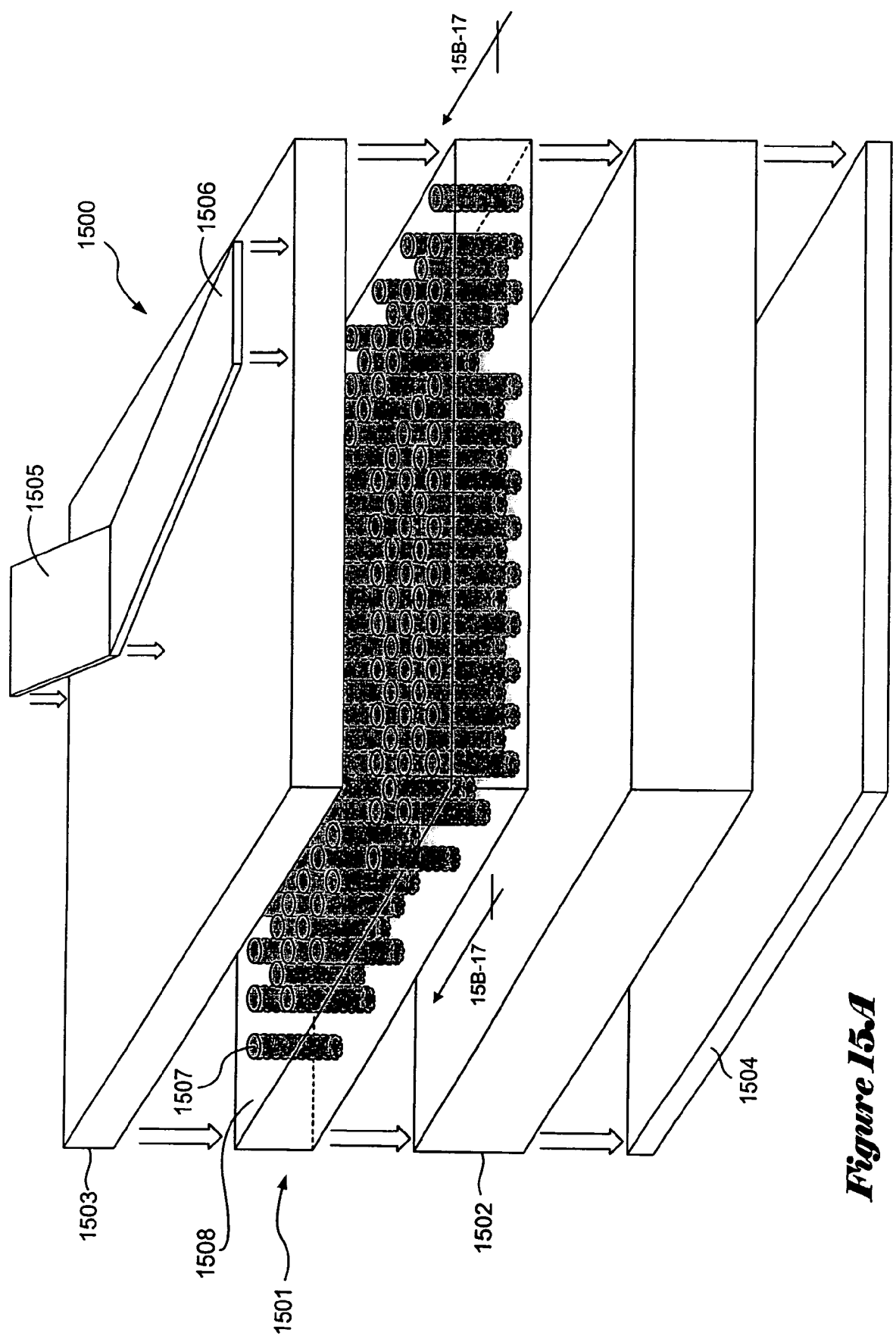
FIG. 15A illustrates a perspective view of a photonic crystal switch with separated layers, that represents one of many possible embodiments of the present invention.

Various embodiments of the present invention are directed to photonic crystal switches having a photonic-crystal interlayer. FIG. 15A illustrates a perspective view of a photonic crystal switch with separated layers that represents one of many possible embodiments of the present invention. Photonic crystal switch 1500 is composed of two-dimensional photonic crystal 1501, described below with reference to FIGS. 16A-16B, a lower cladding layer 1502 located below photonic crystal 1501, an upper cladding layer 1503 located above photonic crystal 1501, a lower contact 1504 located below lower cladding layer 1502, and upper contacts 1505 and 1506 located above upper cladding layer 1503. Photonic crystal 1501, cladding layers 1502 and 1503, and contacts 1504-1506 are attached as indicated by the directional arrows to form a photonic crystal switch. For example, lower cladding layer 1502 attaches to the bottom surface of photonic crystal 1501, and upper cladding layer 1503 attaches to the top surface of photonic crystal 1501. Also, shaded columns, such as shaded column 1507, in photonic crystal 1501 represent a regular triangular lattice of liquid-crystal-filled columns in photonic crystal slab 1508. The lower cladding layer 1502 and upper cladding layer 1503 may have refractive indices smaller than the refractive index of photonic crystal slab 1508 to prevent light transmitted through photonic crystal 1501 from escaping. The refractive index of upper cladding layer 1503 can be different from the refractive index of lower cladding layer 1502. Upper contacts 1505 and 1506 are located directly above waveguides in photonic crystal 1501 and are large enough to apply an electric to one or more rows of liquid-crystal-filled columns lining the waveguides, as described below with reference to FIGS. 17-18A. Note the present invention is not limited to a single lower contact attached to the lower cladding layer, but may also include separate lower contacts located directly below the upper contacts.

Figure 15B:
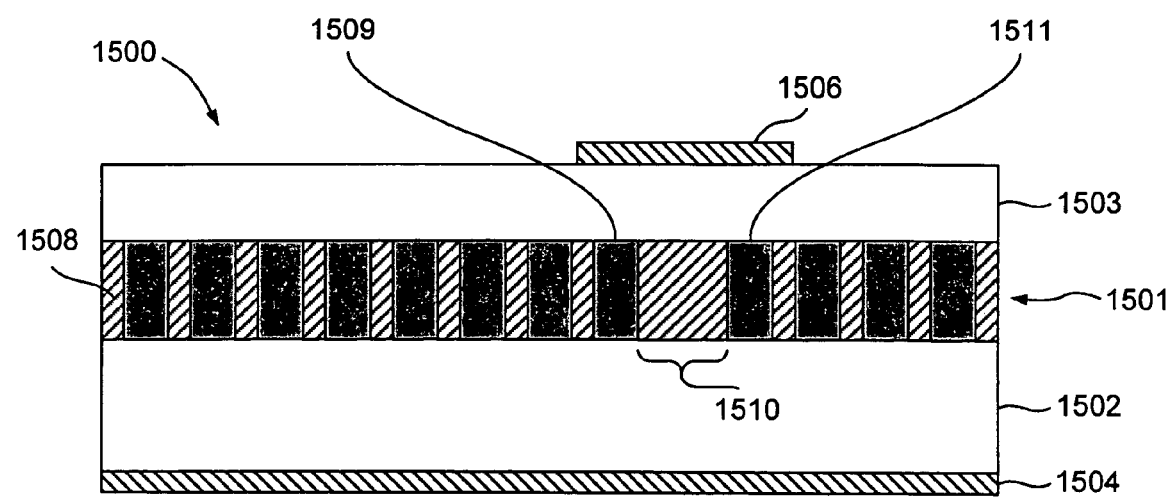
FIG. 15B illustrates a cross-sectional view of the photonic crystal switch shown in FIG. 15A, that represent one of many possible embodiments of the present invention.

FIG. 15B illustrates a cross-sectional view of the photonic crystal switch shown in FIG. 15A, that represent one of many possible embodiments of the present invention. In FIG. 15B, shaded columns, such as shaded column 1509, represent liquid-crystal-filled columns extending from lower cladding layer 1502 to upper cladding layer 1503. Gap 1510 identifies a cross section of a waveguide in photonic crystal 1501, described below with reference to FIG. 16A. The width of upper contact 1506 is large enough to cover liquid-crystal-filled columns 1509 and 1510 as well as the waveguide located between columns 1509 and 1510.

Figure 16A:
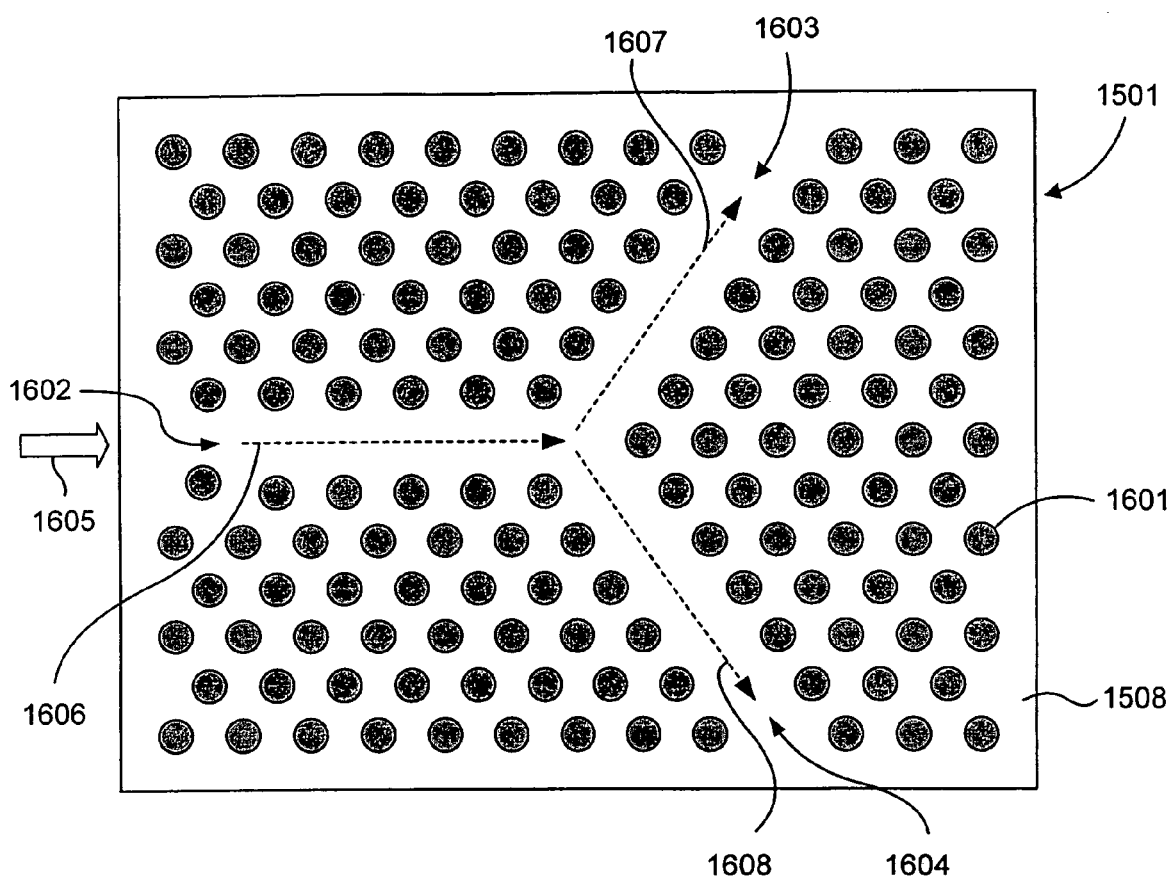
FIG. 16A illustrates a top-down view of the two-dimensional photonic crystal, shown in FIG. 15A, that represents one of many possible embodiments of the present invention.

FIG. 16A shows a top-down view of two-dimensional photonic crystal 1501, described above with reference to FIGS. 15A-15B, that represents one of many possible embodiments of the present invention. Photonic crystal 1501 is a light transmission layer that includes a Y-shaped waveguide surrounded by a lattice of liquid-crystal-filled columns represented by shaded circles, such as shaded circle 1601. The Y-shaped waveguide is composed of waveguide 1602 and branching waveguides 1603 and 1604. Arrow 1605 represents the direction an incident light beam is transmitted into photonic crystal 1501. Waveguide 1602 transmits light in a particular angular frequency range in the direction identified by dashed-line directional arrow 1606 to branching waveguides 1603 and 1604 which transmit the light in the directions identified by dashed-line directional arrows 1607 and 1608, respectively. The refractive index of photonic crystal slab 1508 is different from the refractive index of the liquid crystal deposited in each column. For example, photonic crystal slab 1508 may have a smaller refractive index than the refractive index of the liquid crystal that fills the columns.

Figure 16B:
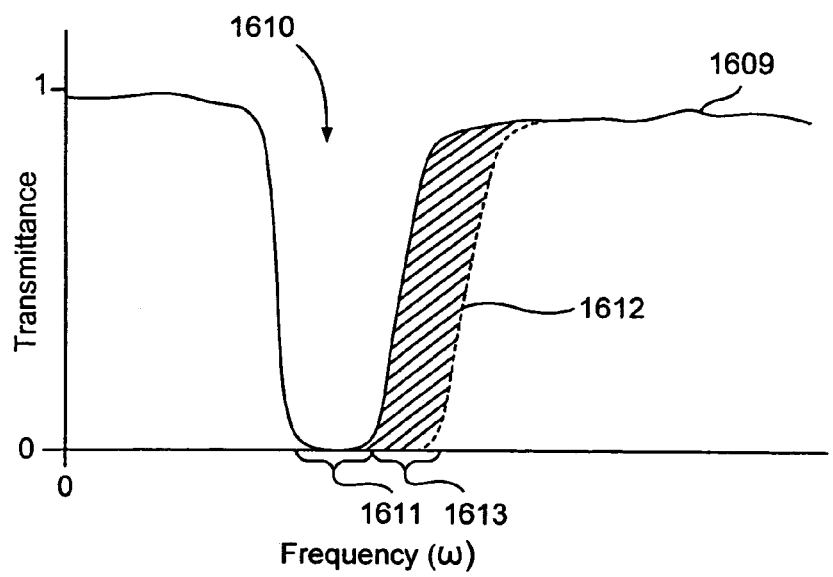
FIG. 16B is a hypothetical plot of transmittance versus angular frequency for the photonic crystal shown in FIG. 16A, that represent one of many possible embodiments of the present invention.

FIG. 16B is a hypothetical plot of transmittance versus angular frequency for the photonic crystal shown in FIG. 16A, that represent one of many possible embodiments of the present invention. Frequency-band spectrum 1609 identifies the angular frequencies transmitted through photonic crystal 1501, and photonic bandgap 1610 identifies angular frequency range 1611 that is not transmitted through photonic crystal 1501. Hash-marked region 1612 identifies angular frequency range 1613 that is exclusively transmitted through waveguides 1602-1604 but not transmitted through regions containing liquid crystal-filled columns, such as liquid crystal-filled column 1601 in FIG. 16A. Waveguides 1602-1604 can be used to confine and bend light having frequencies within angular frequency range 1613. For example, if light beam 1605, shown in FIG. 16A, is composed of light in angular frequency range 1613, then the light is confined to, and directed by, waveguides 1602-1604.

Figure 17:
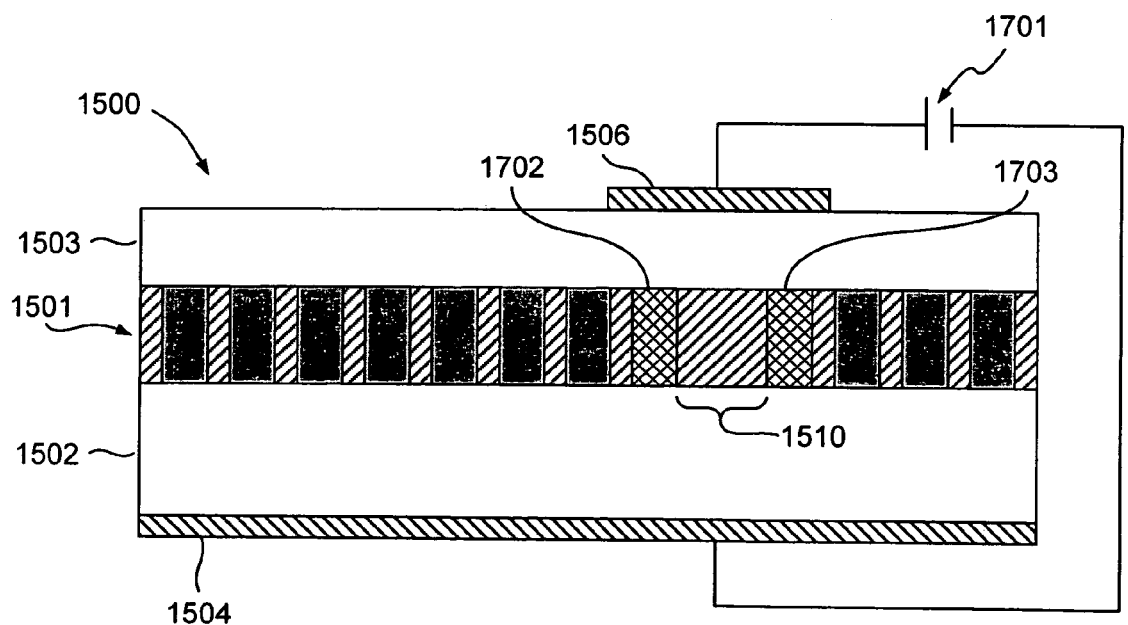
FIG. 17 illustrates a cross-sectional view of the photonic crystal switch, shown in FIG. 15A, including an electric current source, that represent one of many possible embodiments of the present invention.

Branching waveguides 1603 and 1604, shown in FIG. 16A, can be disabled for transmitting light in angular frequency range 1613 by applying electric fields to change the refractive index of the liquid crystal that fills the columns lining branching waveguides 1603 and 1604. FIG. 17 illustrates a cross-sectional view of the photonic crystal switch, shown in FIG. 15A, including an electric current source, that represent one of many possible embodiments of the present invention. Electric current source 1701 transmits an electric current to upper contact 1506 to create a voltage potential difference between upper contact 1506 and lower contact 1504. The potential difference creates an electric field transmitted from upper contact 1506 through cladding layers 1503 and 1502 and through photonic crystal 1501 to lower contact 1504. Lower contact 1504 serves as a ground. The electric field changes the refractive index of the liquid crystal that fills the columns lining the waveguides of photonic crystal 1501. For example, cross-hatched columns 1702 and 1703 lining gap 1510 represent changes in the refractive index of the liquid crystal that fills columns 1509 and 1511, respectively, described above with reference to FIG. 15B.

Figure 18A:
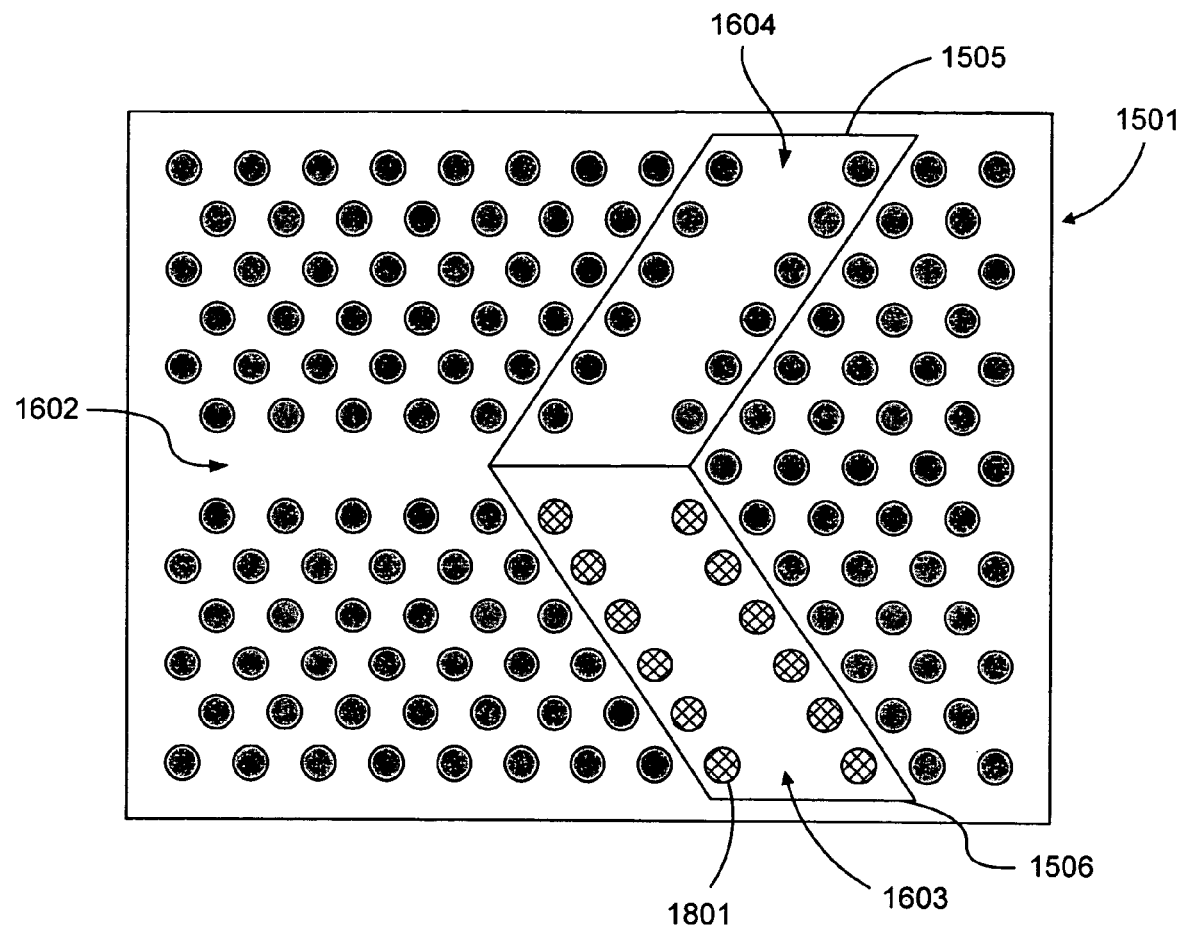
FIG. 18A illustrates a top-down view of the two-dimensional photonic crystal, shown in FIG. 16A, including trapezoids identifying the shapes and locations of the upper contacts, shown in FIGS. 15A-15B, that represent one of many possible embodiments of the present invention.

FIG. 18A illustrates a top-down view of the two-dimensional photonic crystal, shown in FIG. 16A, including parallelograms identifying the shapes and locations of upper contacts 1505 and 1506, described above with reference to FIGS. 15A-15B, that represent one of many possible embodiments of the present invention. An electric field transmitted from upper contacts 1505 and 1506 changes the refractive index of the liquid crystal that fills the columns lining waveguides 1603 and 1604. For example, cross-hatched circles, such as cross-hatched circle 1801, identify liquid-crystal-filled columns having refractive indices changed by the electric field transmitted from upper contact 1506. As a result, the photonic bandgap associated with waveguide 1603 is shifted but the photonic bandgap for the rest of photonic crystal 1501 remains unchanged.

Figure 18B:
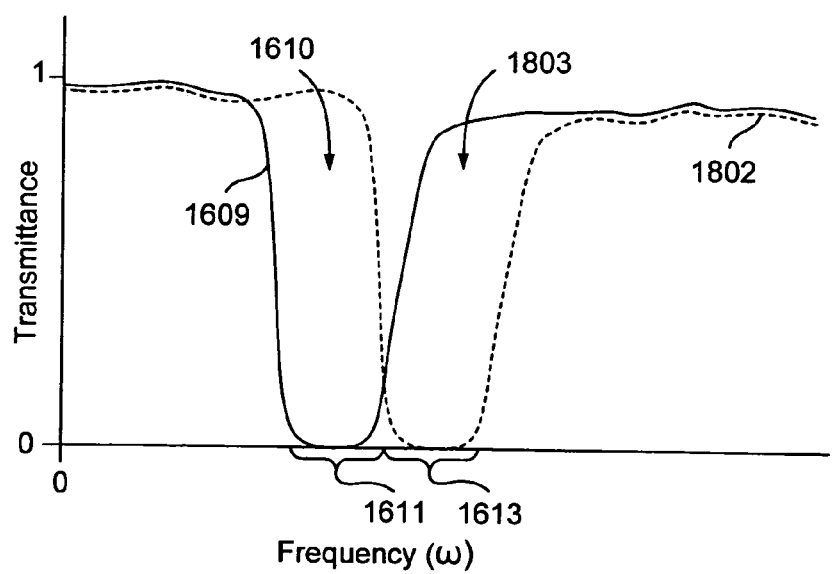
FIG. 18B is a hypothetical plot of transmittance versus angular frequency range for the photonic crystal shown in FIG. 18A, that represent one of many possible embodiments of the present invention.

FIG. 18B is a hypothetical plot of transmittance versus angular frequency range for the photonic crystal shown in FIG. 18A, that represent one of many possible embodiments of the present invention. Solid line curve 1609 represents the frequency-band spectrum for photonic crystal 1501, as described above with reference to FIG. 16B. Photonic bandgap 1610 identifies angular frequency range 1611 where no light is transmitted through photonic crystal 1501. Light in angular frequency range 1613 is exclusively transmitted through waveguides 1602-1604 and not the rest of photonic crystal 1501, as described above with reference to FIG. 16B. Branching waveguides 1603 and 1604 can be disabled for transmitting light in angular frequency range 1613 by an electric field transmitted from upper contacts 1505 and 1506. For example, an electric field between upper contact 1506 and lower contact 1504 causes a shift in the photonic bandgap associated with waveguide 1603. Dashed line curve 1802 identifies the shifted frequency-band spectrum for waveguide 1603 in the presence of the electric field transmitted from upper contact 1506. Photonic bandgap 1803 indicates that for as long as upper contact 1506 emits an electric field, waveguide 1603 is not able to transmit light in angular frequency range 1613.

Figure 19A:
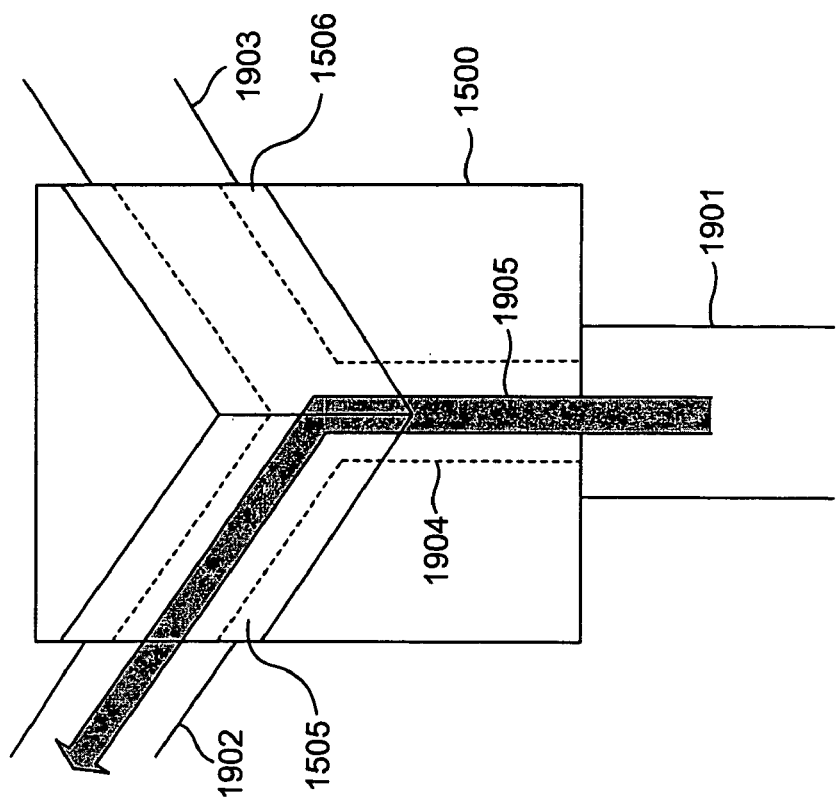
FIGS. 19A-19B illustrate hypothetical operation of the photonic crystal switch, shown in FIG. 15A, representing one of many possible embodiments of the present invention.
Figure 19B:
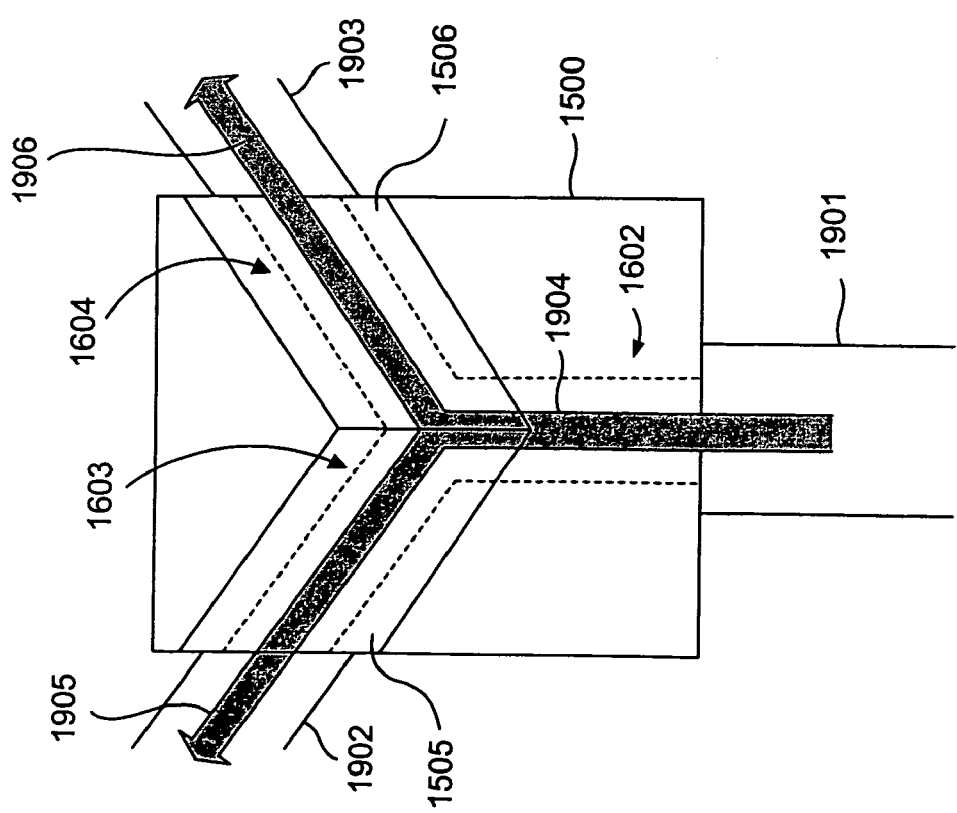

Photonic crystal switch 1500 can be used to control the passage of light from one optical fiber to two other optical fibers. FIGS. 19A-19B illustrate hypothetical operation of the photonic crystal switch, shown in FIG. 15A, that represents one of many possible embodiments of the present invention. In FIGS. 19A-19B, photonic crystal switch 1500 connects optical fiber 1901 to optical fibers 1902 and 1903. In FIG. 19A, when a voltage potential is not applied across the photonic crystal switch, light beam 1904, composed of light having frequencies exclusively in angular frequency range transmitted by the photonic crystal switch branches into light beams 1905 and 1906 that are transmitted by waveguides 1602-1604 to optical fibers 1902 and 1903. However, in FIG. 19B, when a voltage potential is applied across the photonic crystal switch between upper contact 1506 and lower contact 1504 (not shown), waveguide 1604 no longer transmits branching light beam 1906, as described above with reference to FIG. 18B. As a result, photonic crystal switch 1500 can be used to connect and disconnect light transmission between optical fibers.

Figure 20:
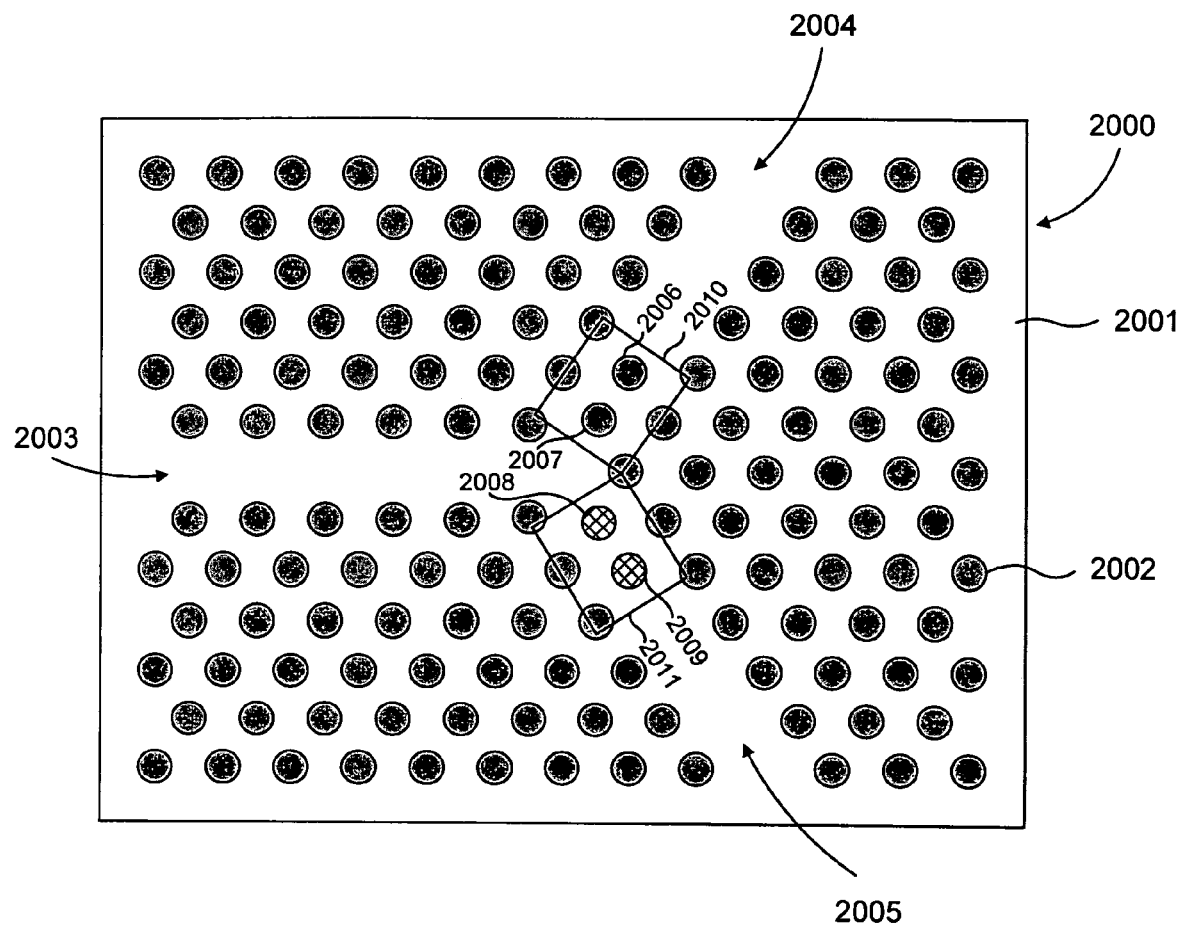
FIG. 20 illustrates a two-dimensional photonic crystal having waveguide branches that can be enabled by application of an electric field representing one of many possible embodiments of the present invention.

In alternate embodiments of the present invention, rather than employing electric fields to disable waveguides of a photonic crystal, such as the photonic crystal 1501 in photonic crystal 1500 described above with reference to FIGS. 18A-19B, electric fields can be applied to enable branching waveguides transmit light in a branching waveguide of a light transmission layer. FIG. 20 illustrates a two-dimensional photonic crystal having waveguide branches that can be enabled by application of an electric field representing one of many possible embodiments of the present invention. In FIG. 20, photonic crystal 2000 is composed of photonic crystal slab 2001 and liquid-crystal-filled columns, such as liquid crystal filled column 2002, that span the depth of photonic crystal slab 2001. Photonic crystal 2000 includes a waveguide 2003 and two branching waveguides 2004 and 2005. Branching waveguide 2004 is separated from waveguide 2003 by liquid-crystal-filled columns 2006 and 2007, and branching waveguide 2005 is separated from waveguide 2003 by liquid-crystal-filled columns 2008 and 2009. The refractive index of the liquid crystal filling columns 2006 and 2007 is controlled by a voltage between upper contact 2010 and a contact directly below (not shown), and the refractive index of liquid crystal filling columns 2008 and 2009 is controlled by a voltage between upper contact 2011 and a contact directly below (not shown).

Branching waveguides 2004 and 2005 permit the transmission of light when a voltage is applied across the liquid-crystal-filled holes separating branching waveguides 2004 and 2005 from waveguide 2003 and do not permit the transmission of light when no voltage is applied across the liquid-crystal-filled holes separating branching waveguides 2004 and 2005 from waveguide 2003. For example, the refractive index of the liquid crystal filling columns 2008 and 2009 is changed by a voltage between contact 2011 and the contact below (not shown) so that specific wavelengths of light propagating in waveguide 2003 can propagate along branching waveguide 2005, as indicated by crosshatched circles. In contrast, by not providing a voltage between upper contact 2010 and the contact below, the refractive index of liquid-crystal filled holes 2006 and 2007 is unchanged. As a result, light transmitted in waveguide 2003 is not transmitted into branching waveguide 2004.

The present invention is not limited to employing two liquid-crystal filled columns to separate a branching waveguide from another waveguide, as described above with reference to FIG. 20. In alternate embodiments, any number of liquid crystal filled columns can be used to separate a branching waveguide from another waveguide to ensure that light propagating in a waveguide is not permitted to enter a branching waveguide unless a voltage is applied to the liquid crystal filled columns separating the branching waveguide from the other waveguide.

Figure 21A:
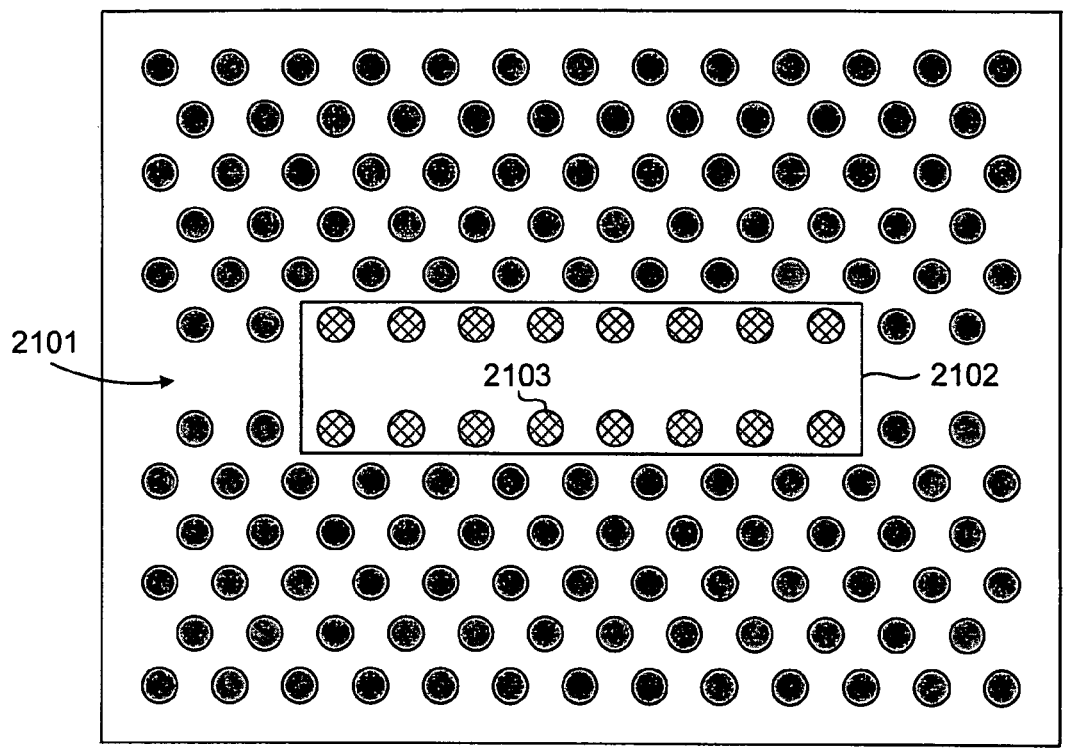
FIGS. 21A-21B conceptually illustrate use of a voltage to control the transmission of light along a single waveguide, representing two of many possible embodiments of the present invention.
Figure 21B:
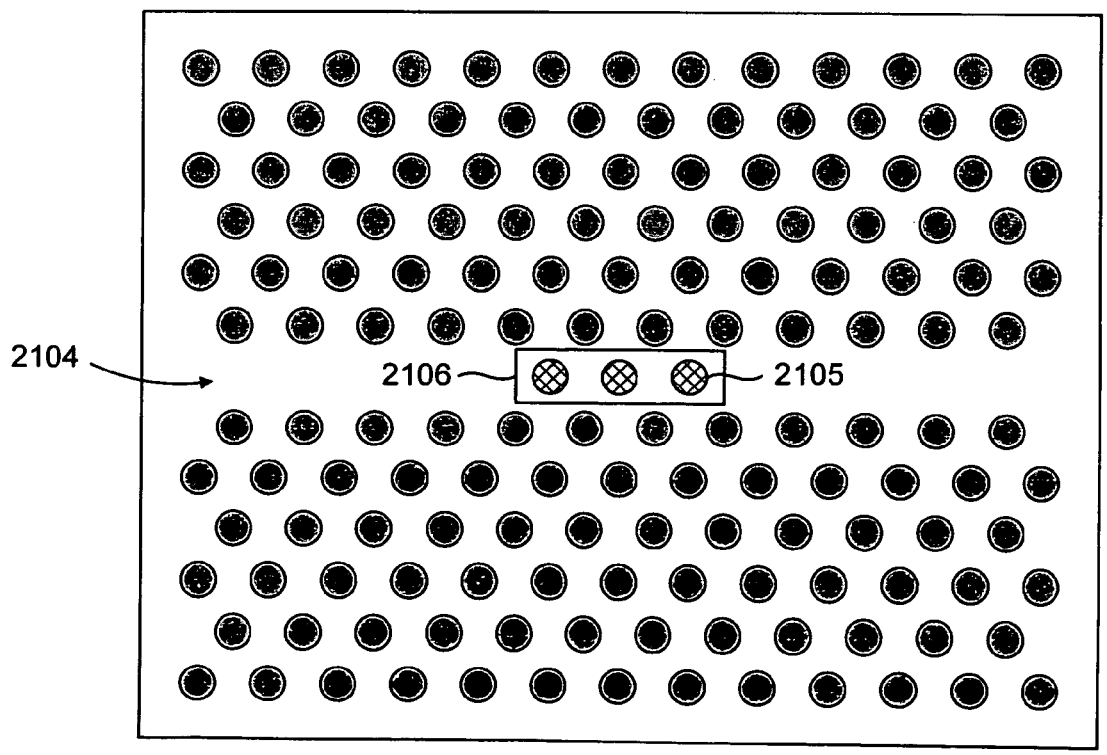

In alternate embodiments of the present invention, the photonic crystal may contain one or more waveguides that can be controlled by the application of a voltage to allow light to propagate in the waveguides. FIGS. 21A-21B conceptually illustrate use of a voltage to control the transmission of light along a single waveguide, representing two of many possible embodiments of the present invention. In FIG. 21A, waveguide 2101 is controlled by applying a voltage between upper contract 2102 and a lower contact (not shown). A voltage created between upper contact 2102 and the lower contact (not shown) changes the refractive index of the liquid crystal filling the columns lining waveguide 2101, as indicated by crosshatched circles, such as crosshatched circle 2103, to prevent light from propagating completely through waveguide 2101. In FIG. 21B, waveguide 2104 includes three liquid-crystal filled columns, such as liquid crystal filled column 2105, that prevent light from propagating completely through waveguide 2104. A voltage created between upper contact 2106 and a lower contact (not shown) changes the refractive index of the three liquid crystal filled columns, as indicated by crosshatched circles. As a result, light is permitted to propagate in waveguide 2104 past the three liquid crystal filled columns when a voltage is applied.

Figure 22:
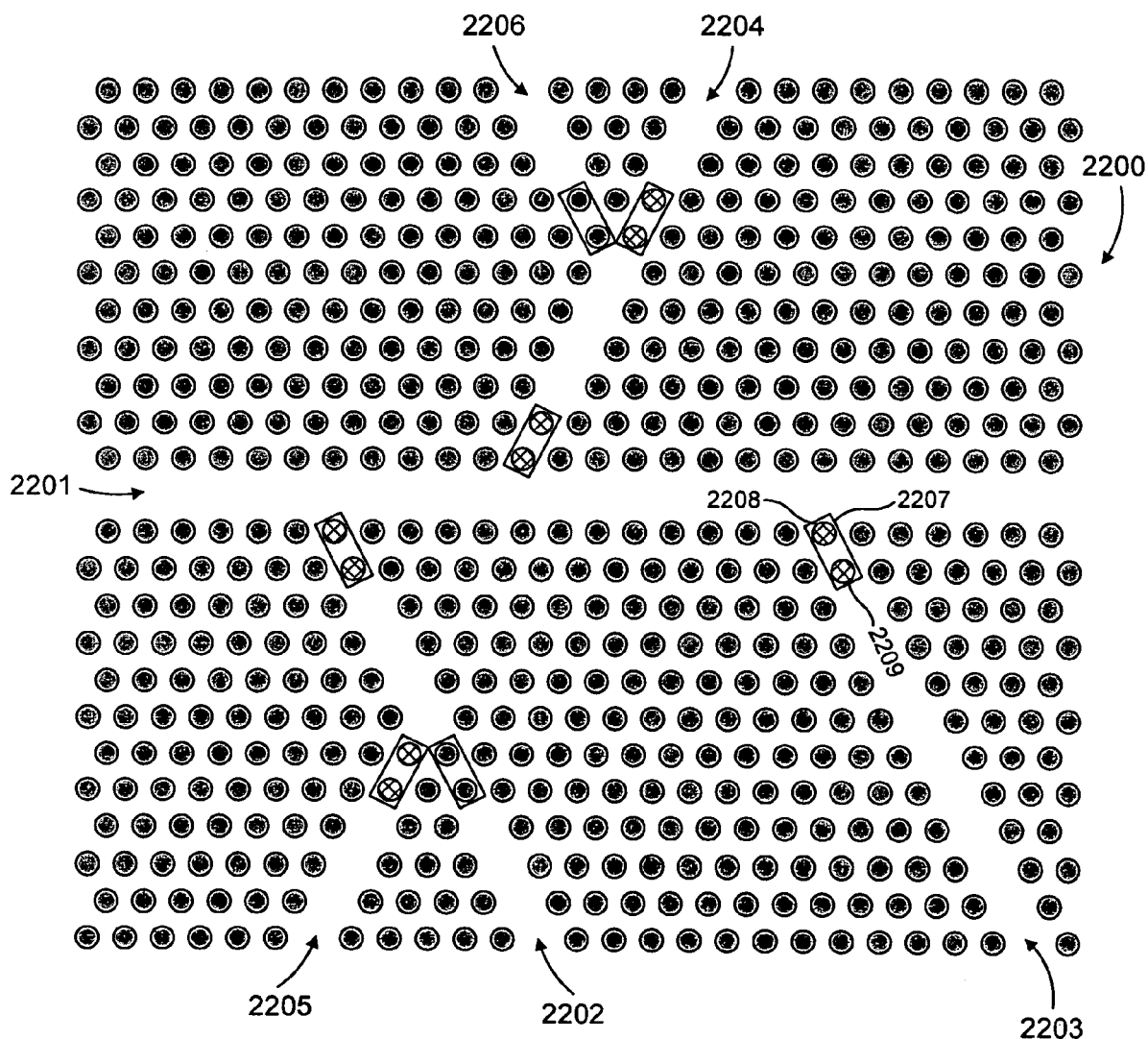
FIG. 22 illustrates an exemplary photonic crystal interlayer having numerous branching waveguides, representing one of many possible embodiments of the present invention.

The present invention is not limited to a photonic-crystal interlayer having a single Y-shaped waveguide. In alternate embodiments, photonic crystal interlayers can be fabricated to include photonic crystal switches having an almost limitless number of branching waveguides. FIG. 22 illustrates an exemplary photonic crystal interlayer having numerous branching waveguides, representing one of many possible embodiments of the present invention. In FIG. 22, photonic crystal 2200 includes a main waveguide 2201 with three branching waveguides 2202-2204. Branching waveguides 2202 and 2204 include additional branching waveguides 2205 and 2206, respectively. Each branching waveguide is enabled by employing two liquid-crystal filled columns, an upper contact, and a lower contact, as described above with reference to FIG. 20. For example, branching waveguide 2203 is transmits light with a specific frequency in the photonic crystal bandgap by created a voltage between upper contact 2207 and a lower contact (not shown) to change the refractive index of the liquid crystal filling columns 2208 and 2209 identified by crosshatched circles. As a result, light propagating in waveguide 2201 is permitted to propagate from waveguide 2201 into waveguide 2203.

Figure 23A:
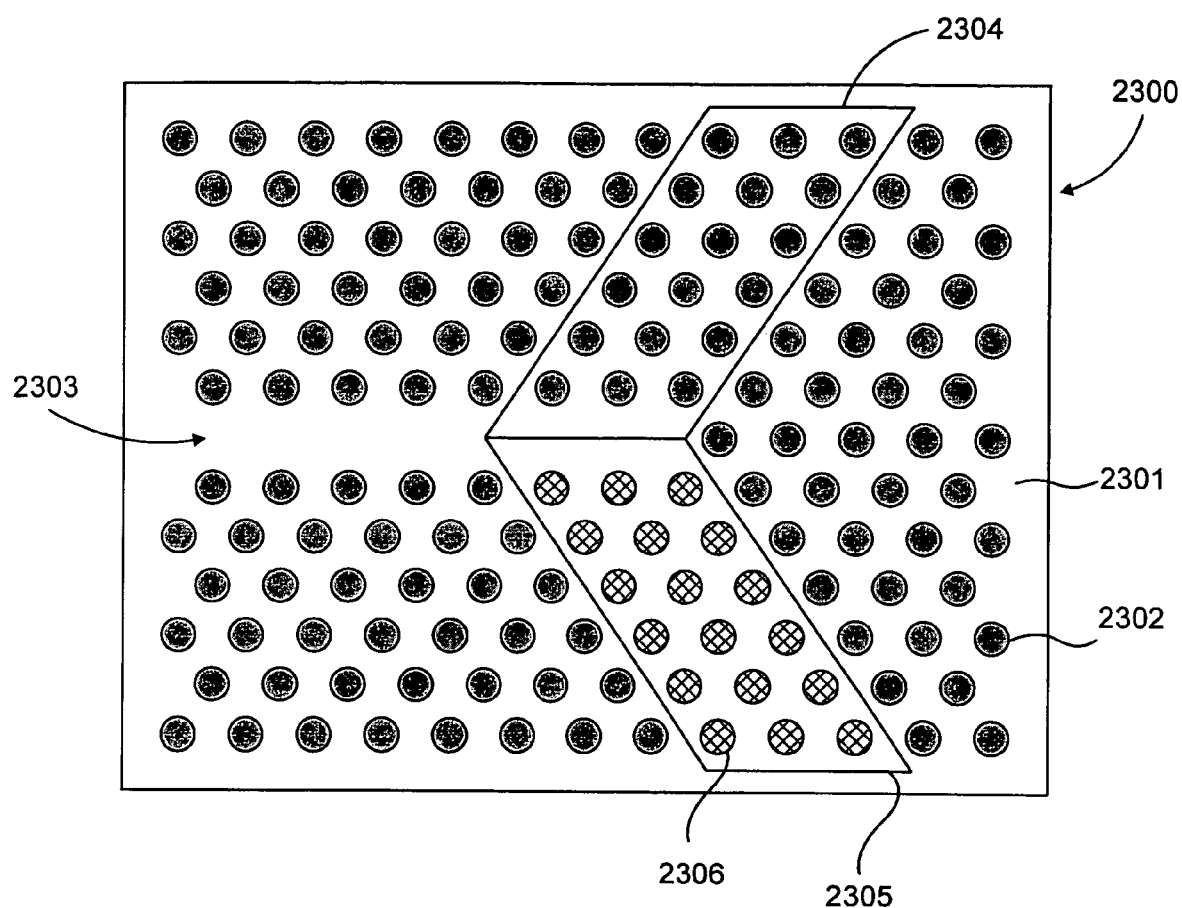
FIG. 23A illustrates a two-dimensional photonic crystal, having waveguide branches created by application of an electric field, representing one of many possible embodiments of the present invention.
Figure 23B:
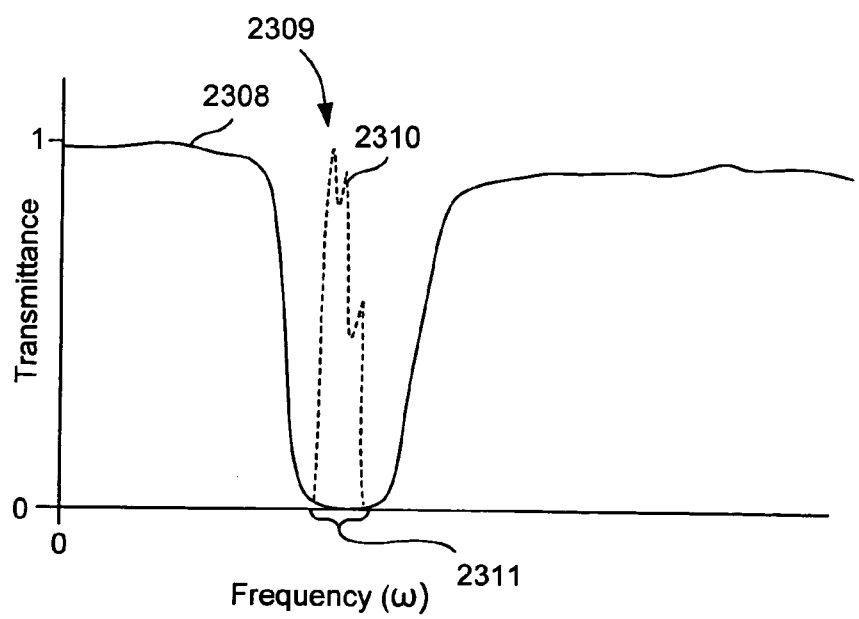
FIG. 23B is a hypothetical plot of transmittance versus angular frequency for the photonic crystal shown in FIG. 20A, representing one of many possible embodiments of the present invention.

In an alternate embodiment of the present invention, the photonic crystal 1501 in photonic crystal switch 1500 can be replaced with photonic crystal 2300, shown in FIG. 23A. FIG. 23A illustrates a two-dimensional photonic crystal, having waveguide branches that can be created by application of an electric field, that represent one of many possible embodiments of the present invention. In FIG. 23A, photonic crystal 2300 is composed of photonic crystal slab 2301 and liquid-crystal-filled columns 2302 that span the depth of photonic crystal 2300. Photonic crystal 2300 includes a single waveguide 2303 fabricated by omitting columns in a row that extends only part way through photonic crystal 2300. Upper contacts 2304 and 2305 emit electric fields that change the refractive index of the liquid crystal that fills the columns below to create waveguide branches extending from waveguide 2303. For example, crosshatched circle 2306 represents a liquid crystal filled column having a refractive index changed by the electric field transmitted from upper contact 2305. Changing the refractive index of the liquid crystal that fills the columns below an upper contact, such as upper contact 2305, creates a waveguide that can be used to transmit a certain frequency range in the photonic bandgap of photonic crystal 2300. FIG. 23B is a hypothetical plot of transmittance versus angular frequency for the photonic crystal shown in FIG. 23A. Curve 2308 identifies the frequency-band spectrum with photonic bandgap 2309. Dashed-line peak 2310 identifies angular frequency range 2311 that can be transmitted exclusively through waveguide 2303 and the waveguide identified by cross-hatched circles in FIG. 23A.

Figure 24:
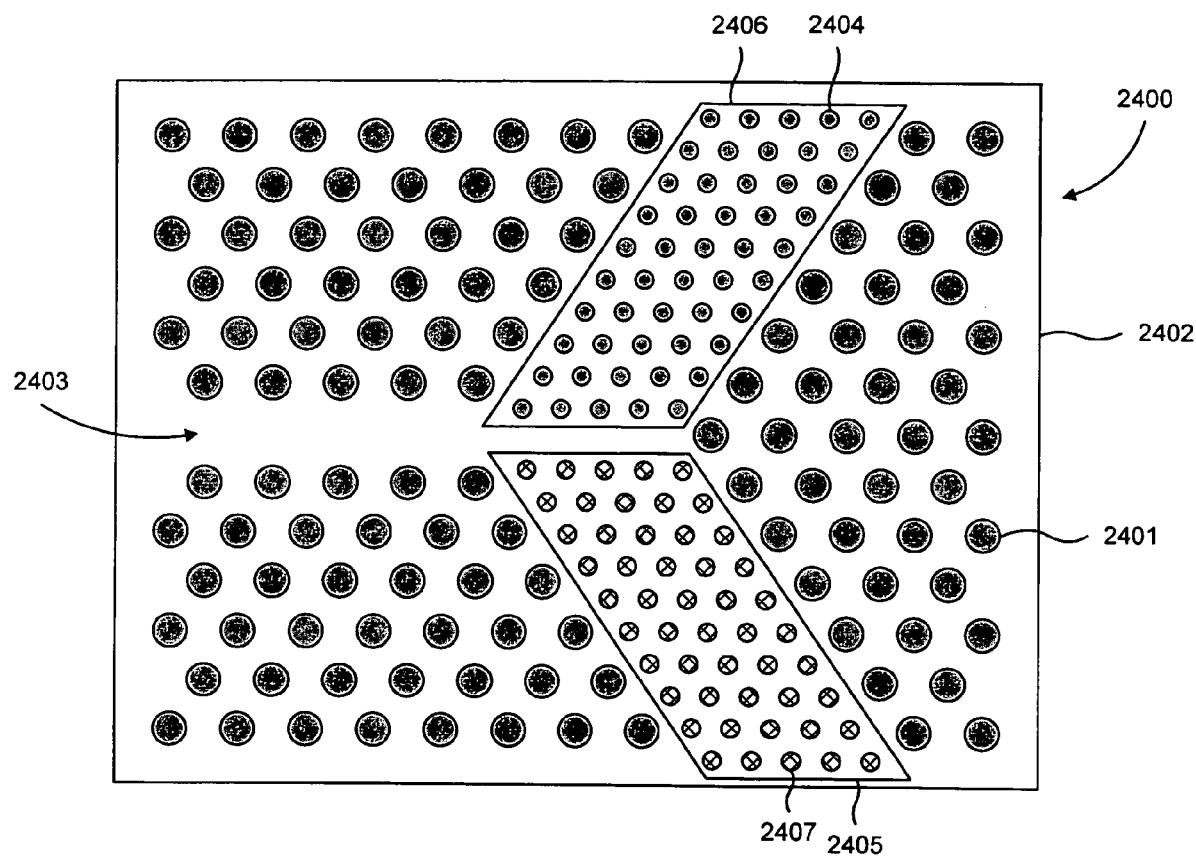
FIG. 24 illustrates a two-dimensional photonic crystals having Y-shaped waveguide with branches of liquid-crystal-filled columns having dimensions smaller than surrounding liquid-crystal-filled columns, representing one of many possible embodiments of the present invention.

In an alternate embodiment, the photonic crystal 1501 in photonic crystal 1500 can be replaced with photonic crystal 2400, shown in FIG. 24. FIG. 24 illustrates a two-dimensional photonic crystals having Y-shaped waveguide with branches of liquid-crystal-filled columns having dimensions smaller than surrounding liquid-crystal-filled columns, representing one of many possible embodiments of the present invention. In FIG. 24, photonic crystals 2400 is composed of a triangular lattice of liquid-crystal-filled columns, such as liquid-crystal-filled column 2401, that spans the depth of photonic crystal slab 2402. The Y-shaped waveguide is composed of main waveguide 2403 and two branching waveguides identified by sub-lattices of liquid-crystal-filled columns having smaller diameters than liquid-crystal-filled columns outside the Y-shaped wave guide, such as liquid-crystal-filled column 2404. The size of the liquid-crystal-filled columns and associated lattice constant in the branching waveguides are selected so that certain angular frequency ranges propagating in main waveguide 2403 can propagate in the branching waveguides. Contacts 2405 and 2406 supply electrical fields that change the refractive index of the smaller liquid-crystal-filled columns to approximate the refractive index of the liquid-crystal-filled columns surrounding the branching waveguides. For example, in FIG. 24, an electric field supplied by contact 2405 changes the refractive index of the liquid-crystal-filled columns located below contact 2405, as indicated by crosshatched circles, such as crosshatched circle 2407, to approximate the refractive index of the surrounding liquid-crystal-filled columns. As a result, light propagating in waveguide 2403 is no longer permitted to propagate in the waveguide beneath contact 2405.

Figure 25:
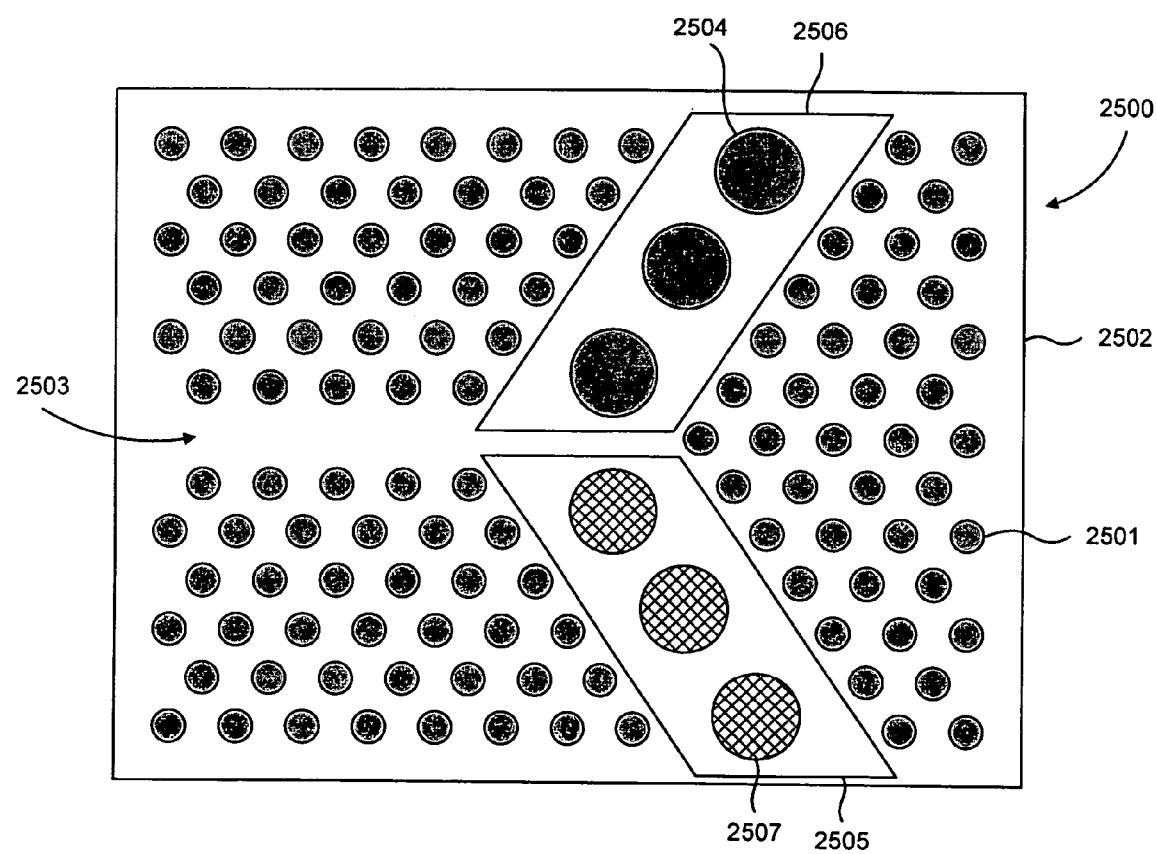
FIG. 25 illustrates a two-dimensional photonic crystals having Y-shaped waveguide with branches of liquid-crystal-filled columns having dimensions larger than surrounding liquid-crystal-filled columns, representing one of many possible embodiments of the present invention.

In an alternate embodiment, the photonic crystal 1501 in photonic crystal 1500 can be replaced with photonic crystal 2500, shown in FIG. 25. FIG. 25 illustrates a two-dimensional photonic crystals having Y-shaped waveguide with branches of liquid-crystal-filled columns having dimensions larger than surrounding liquid-crystal-filled columns, representing one of many possible embodiments of the present invention. In FIG. 25, photonic crystals 2500 is composed of a triangular lattice of liquid-crystal-filled columns, such as liquid-crystal-filled column 2501, that spans the depth of photonic crystal slab 2502. The Y-shaped waveguide is composed of main waveguide 2503 and two branching waveguides identified by sub-lattices of liquid-crystal-filled columns having larger diameters than liquid-crystal-filled columns outside the Y-shaped wave guide, such as liquid-crystal-filled column 2504. The size of the liquid-crystal-filled columns and associated lattice constant in the branching waveguides are fabricated so that certain angular frequency ranges propagating in main waveguide 2503 can propagate in the branching waveguides. Contacts 2505 and 2506 supply electrical fields that change the refractive index of the smaller liquid-crystal-filled columns to approximate the refractive index of the liquid-crystal-filled columns surrounding the branching waveguides. For example, in FIG. 25, an electric field supplied by contact 2505 changes the refractive index of the liquid-crystal-filled columns located below contact 2505, as indicated by crosshatched circles, such as crosshatched circle 2507, to approximate the refractive index of the surrounding liquid-crystal-filled columns. As a result, light propagating in waveguide 2503 is no longer permitted to propagate in the waveguide beneath contact 2505.

Figure 26:
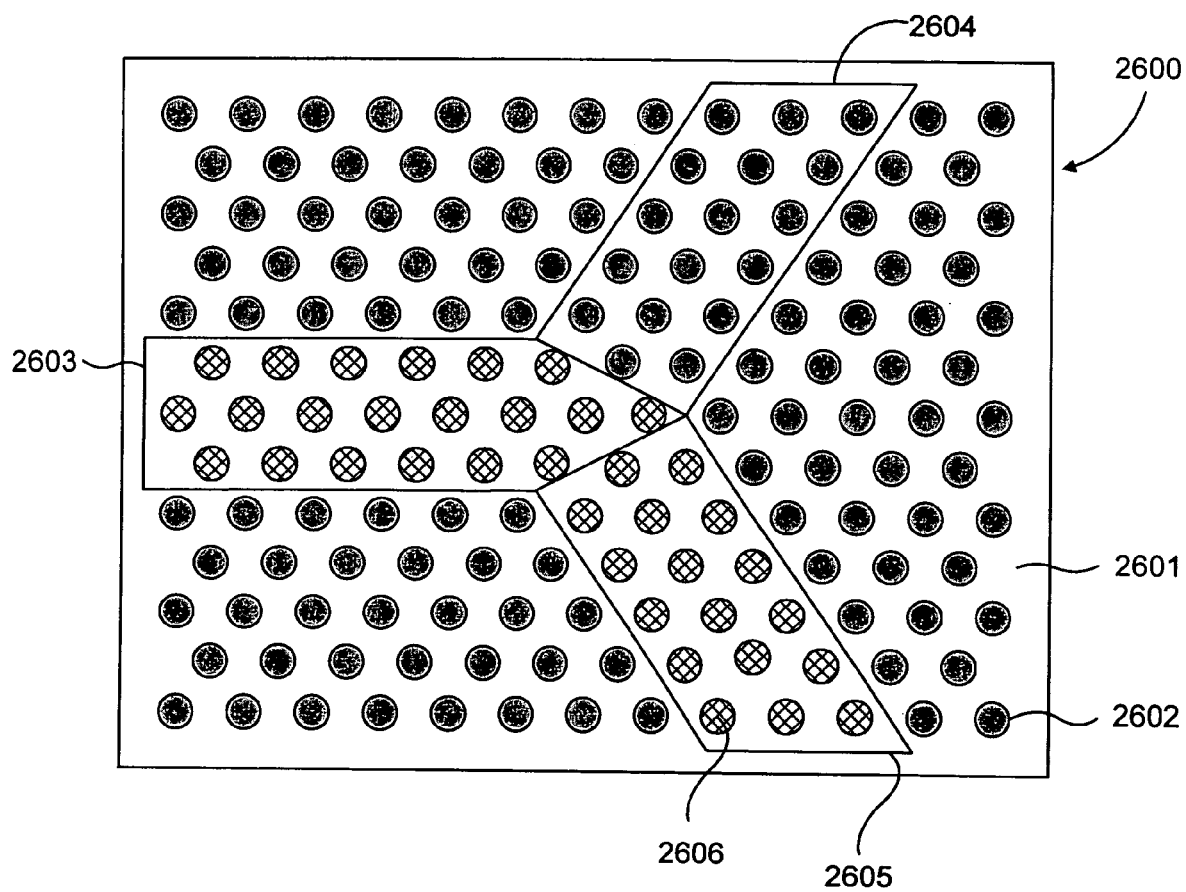
FIG. 26 illustrates a two-dimensional photonic crystal, having a Y-shaped waveguide created by application of separate electric fields, representing one of many possible embodiments of the present invention.

In an alternate embodiment of photonic crystal switch 1500, photonic crystal 2600, shown in FIG. 26, is employed. FIG. 26 illustrates a two-dimensional photonic crystal, having a Y-shaped waveguide created by application of separate electric fields, that represents one of many possible embodiments of the present invention. In FIG. 26, photonic crystal 2600 is composed of photonic crystal 2601 and a triangular lattice of liquid-crystal-filled columns 2602 that span the depth of photonic crystal 2600. Shapes 2603-2605 identify the shapes and location of three upper contacts that apply separate electric fields to change the refractive index of the liquid crystal that fills the columns below. Waveguides are created to transmit specific frequencies of light with the photonic bandgap by electric fields transmitted from upper contacts 2603-2605 to change the refractive index of the liquid crystal that fills the columns below. For example, electric fields emitted by upper contacts 2603 and 2605 creates a waveguide by changing the refractive index of the liquid crystal in the columns identified by cross-hatched circles, such as cross-hatched circles 2606.

Figure 27:
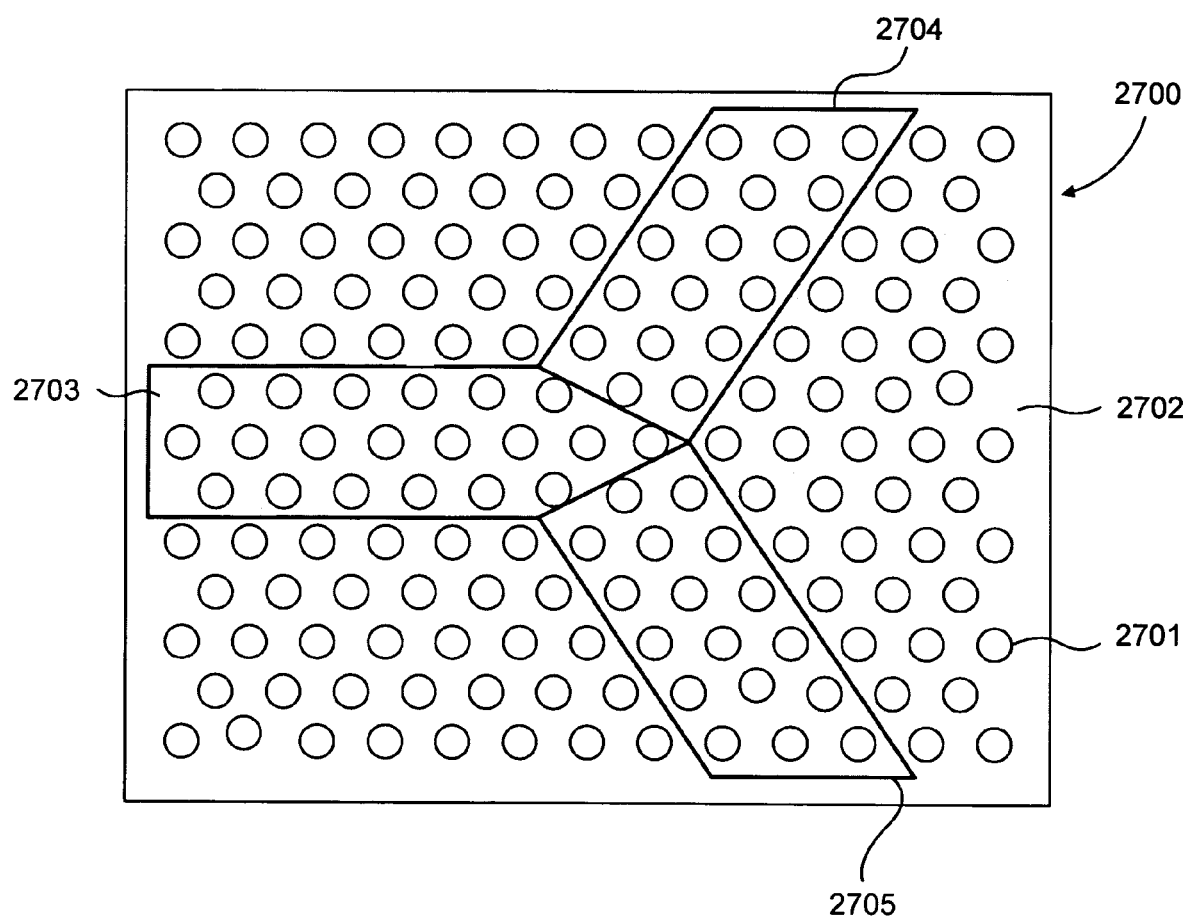
FIG. 27 illustrates a two-dimensional photonic crystal, having a Y-shaped waveguide created in the liquid crystal surrounding cylindrical columns by applying separate electric fields, representing one of many possible embodiments of the present invention.

In an alternate embodiment of photonic crystal switch 1500, photonic crystal 2700, shown in FIG. 27, is employed. FIG. 27 illustrates a two-dimensional photonic crystal, having a Y-shaped waveguide created in the liquid crystal surrounding cylindrical columns by applying separate electric fields, which represents one of many possible embodiments of the present invention. In FIG. 27, photonic crystal 2700 is composed of cylindrical columns, such as cylindrical column 2701, that span the depth of photonic crystal 2700 surrounded by liquid crystal 2702. Electric fields transmitted from upper contacts 2703-2705 create waveguides in photonic crystal 2700 by changing the refractive index of the liquid crystal surrounding the columns.

Although the present invention has been described in terms of particular embodiments, it is not intended that the invention be limited to these embodiments. Modifications within the spirit of the invention will be apparent to those skilled in the art. For example, in alternate embodiments, rather than removing liquid-crystal-filled columns to create waveguides, waveguides can be created in a photonic crystal slab by varying the size and/or shape of certain liquid-crystal-filled columns. In alternate embodiments, the photonic-crystal-slab columns can have the following shapes: triangular, square, rectangular, pentagonal, hexagonal, heptagonal, or octagonal. In alternate embodiments, the waveguides can be comprised of air filled columns while the rest of the photonic crystal is composed of liquid-crystal-filled columns. In alternate embodiments, one or more waveguides can be created by employing numerous waveguide branches. In alternate embodiments, three-dimensional photonic crystals can be employed to provide waveguides.

In the embodiments described above with reference to FIGS. 15A-27, the lattice constant along a first direction of a photonic crystal may not be the same as the lattice constant in a second orthogonal direction. The lattice constant can be different along orthogonal directions in order to compensate for any anisotropy attributed to the liquid-crystal-refraction indices.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A photonic crystal switch comprising:
   a photonic-crystal-based light transmission layer having an input waveguide and at least one branching waveguide in optical communication with the input waveguide, wherein the input waveguide and the at least one branching waveguide are capable of transmitting a light beam whether or not a voltage is applied to the photonic-crystal-based light transmission layer;
   a liquid crystal positioned within at least a portion of the at least one branching waveguide and having a first configuration that prevents the light beam from propagating from the input waveguide into the at least one branching waveguide; and
   two or more electrical contacts positioned relative the liquid crystal, wherein applying an appropriate voltage to the two or more electrodes changing the liquid crystal into a second configuration allowing the light beam to propagate from the input waveguide into the at least one branching waveguide.

2. The photonic crystal switch of claim 1 wherein the at least one branching waveguide including the liquid crystal further comprises a photonic crystal slab with liquid-crystal-filled columns.

3. The photonic crystal switch of claim 1 wherein the at least one branching waveguide including the liquid crystal further comprises cylindrical columns surrounded by the liquid crystal.

4. The photonic crystal switch of claim 1 wherein the at least one branching waveguides comprise channels through a regular pattern of liquid-crystal-filled-columns.

5. The photonic crystal switch of claim 1 wherein the at least one branching waveguides comprise liquid-crystal-filled columns of a first size surrounded by liquid-crystal-filled columns of a second size.

6. The photonic crystal switch of claim 1 wherein the at least one branching waveguides comprise applying a voltage across the photonic-crystal-based light transmission layer to change the refractive index of the liquid crystal.

7. The photonic crystal switch of claim 1 wherein the photonic crystal switch further comprises one or more cladding layers to prevent the attenuation of light transmitted in the photonic-crystal-based light transmission layer.

8. The photonic crystal switch of claim 7 wherein the one or more cladding layers are each one or more of:
   a layer of air; and
   a layer with a refractive index larger than the photonic-crystal-based light transmission layer refractive index.

9. A method for directing light through a photonic crystal, the method comprising:
   providing a photonic crystal switch having a photonic-crystal-based light transmission layer configured with an input waveguide and at least one branching waveguide in optical communication with the input waveguide, a liquid crystal positioned within at least a portion of the at least one branching waveguide, and two or more electrical contacts positioned relative the liquid crystal;
   inputting a light beam to the input waveguide, wherein the input waveguide and the at least one branching waveguide are capable of transmitting the light beam whether or not a voltage is applied to the photonic-crystal-based light transmission layer, and the liquid crystal is in a first configuration that prevents the light beam from propagating from the input waveguide into the at least one branching waveguide; and
   applying an appropriate voltage to the two or more electrodes changing the liquid crystal into a second configuration allowing the light beam to propagate from the input waveguide into the at least one branching waveguide.

10. The method of claim 9 wherein the at least one branching waveguide including the liquid crystal further comprises a photonic crystal slab with liquid-crystal-filled columns.

11. The method of claim 9 wherein the at least one branching waveguide including the liquid crystal further comprises cylindrical columns surrounded by the liquid crystal.

12. The method of claim 9 wherein the at least one branching waveguides comprise channels through a regular pattern of liquid-crystal-filled-columns.

13. The method of claim 9 wherein the at least one branching waveguides comprise liquid-crystal filled columns of a first size surrounded by liquid-crystal-filled columns of a second size with positions in a regular pattern.

14. The method of claim 9 wherein the at least one branching waveguides comprise applying a voltage across the photonic-crystal-based light transmission layer to change the refractive index of the liquid crystal.

15. The method of claim 9 wherein the photonic-crystal-based light transmission layer further comprises one or more cladding layers to prevent the attenuation of light transmitted in the photonic-crystal-based light transmission layer.

16. The method of claim 15 wherein the one or more cladding layers are each one or more of:
   a layer of air; and
   a layer with a refractive index larger than the photonic-crystal-based light transmission layer refractive index.

* * * * *

UNITED STATES PATENT AND TRADEMARK OFFICE
CERTIFICATE OF CORRECTION

PATENT NO. : 7,315,663 B2
APPLICATION NO. : 11/150332
DATED : January 1, 2008
INVENTOR(S) : Wei Wu It is certified that error appears in the above-identified patent and that said Letters Patent is hereby corrected as shown below:

In column 5, line 42, delete "$H)(\vec{r},t)=\exp(\vec{k}\cdot\vec{r}-i\omega)(\vec{k})t)H_{\vec{k}}(\vec{r})$" and insert -- $H(\vec{r},t) = \exp(\vec{k}\cdot\vec{r} - i\omega(\vec{k})t)\vec{H}_{\vec{k}}(\vec{r})$ Equation 5 --, therefor.

In column 5, line 67, delete "$H_{n,\vec{k}}(\vec{r})$" and insert -- $\vec{H}_{n,\vec{k}}(\vec{r})$ --, therefor.

Signed and Sealed this

Tenth Day of November, 2009

David J. Kappos
*Director of the United States Patent and Trademark Office*